United States Patent
Downie et al.

(10) Patent No.: US 7,782,202 B2
(45) Date of Patent: *Aug. 24, 2010

(54) RADIO FREQUENCY IDENTIFICATION OF COMPONENT CONNECTIONS

(75) Inventors: John D. Downie, Painted Post, NY (US); Brewster R. Hemenway, Painted Post, NY (US); James S. Sutherland, Corning, NY (US); Mark P. Taylor, Montour Falls, NY (US); Matthew S. Whiting, Lawrenceville, PA (US); Richard E. Wagner, Painted Post, NY (US)

(73) Assignee: Corning Cable Systems, LLC, Hickory, NC (US)

( * ) Notice: Subject to any disclaimer, the term of this patent is extended or adjusted under 35 U.S.C. 154(b) by 827 days.

This patent is subject to a terminal disclaimer.

(21) Appl. No.: 11/590,505

(22) Filed: Oct. 31, 2006

(65) Prior Publication Data

US 2008/0100467 A1    May 1, 2008

(51) Int. Cl.
G08B 13/14    (2006.01)
(52) U.S. Cl. .................................. 340/572.1; 340/10.1
(58) Field of Classification Search ............. 340/572.1, 340/10.1, 10.4, 825.69–825.7; 174/92
See application file for complete search history.

(56) References Cited

U.S. PATENT DOCUMENTS

| | | | |
|---|---|---|---|
| 3,052,842 A | 9/1962 | Frohman et al. | |
| 3,609,742 A | 9/1971 | Burdick | |
| 3,771,098 A | 11/1973 | Dempsey | |
| 3,931,574 A | 1/1976 | Curtis, Jr. et al. | |
| 3,942,859 A | 3/1976 | Korodi | |
| 4,019,128 A | 4/1977 | Chebowski | |

(Continued)

FOREIGN PATENT DOCUMENTS

DE    19841738    3/2000

(Continued)

OTHER PUBLICATIONS

Wilson, Brian et al., "Multiwavelength Optical Networking Management and Control," Journal of Lightwave Technology, IEEE Dec. 1, 2000, vol. 18, No. 12, pp. 2038-2057.

(Continued)

Primary Examiner—Daniel Wu
Assistant Examiner—Shirley Lu
(74) Attorney, Agent, or Firm—Kwadjo Adusei-Poku

(57) ABSTRACT

There is provided a system for identifying a connection of two or more components in which one or more RFID transponders are associated with the two or more components. A plug is associated with the first component, such as a fiber optic connector, and a socket is associated with the second component, such as a fiber optic adapter. An RFID transponder is associated with each component and at least one of the RFID transponders is activatable when the plug is received by the socket to enable the activated RFID transponder to communicate with the RFID reader. The antennas and integrated circuit chips that define the RFID transponders are positioned relative to the plug and socket to enable the one or more RFID transponders to activate when the plug is received by the socket. In addition, the RFID transponders may communicate with one another to identify other RFID transponders in order to communicate identities of two or more RFID transponders.

43 Claims, 10 Drawing Sheets

U.S. PATENT DOCUMENTS

| | | |
|---|---|---|
| 4,200,862 A | 4/1980 | Campbell et al. |
| 4,365,238 A | 12/1982 | Kollin |
| 4,418,333 A | 11/1983 | Schwarzbach et al. |
| 4,578,636 A | 3/1986 | Bakke et al. |
| 4,626,633 A | 12/1986 | Ruehl et al. |
| 4,630,886 A | 12/1986 | Lauriello et al. |
| 4,889,977 A | 12/1989 | Haydon |
| 4,915,639 A | 4/1990 | Cohn et al. |
| 4,924,213 A | 5/1990 | Decho et al. |
| 4,937,529 A | 6/1990 | O'Toole, III et al. |
| 4,968,929 A | 11/1990 | Hauck et al. |
| 4,978,317 A | 12/1990 | Pocrass |
| 5,081,627 A | 1/1992 | Yu |
| 5,185,570 A | 2/1993 | Fitzpatrick |
| 5,199,093 A | 3/1993 | Longhurst |
| 5,222,164 A | 6/1993 | Bass, Sr. et al. |
| 5,244,409 A | 9/1993 | Guss, III et al. |
| 5,265,187 A | 11/1993 | Morin et al. |
| 5,297,015 A | 3/1994 | Miyazaki et al. |
| 5,305,405 A | 4/1994 | Emmons et al. |
| 5,337,400 A | 8/1994 | Morin et al. |
| 5,353,367 A | 10/1994 | Czosnowski et al. |
| 5,394,503 A | 2/1995 | Dietz, Jr. et al. |
| 5,418,334 A | 5/1995 | Williams |
| 5,448,675 A | 9/1995 | Leone et al. |
| 5,461,693 A | 10/1995 | Pimpinella |
| 5,473,715 A | 12/1995 | Schofield et al. |
| 5,483,467 A | 1/1996 | Krupka et al. |
| 5,528,222 A | 6/1996 | Moskowitz et al. |
| 5,588,873 A | 12/1996 | Hamai et al. |
| 5,601,451 A | 2/1997 | Driones et al. |
| 5,613,873 A | 3/1997 | Bell, Jr. |
| 5,638,818 A | 6/1997 | Diab et al. |
| 5,645,440 A | 7/1997 | Tobler et al. |
| 5,660,567 A | 8/1997 | Nierlich et al. |
| 5,666,453 A | 9/1997 | Dannenmann |
| 5,685,737 A | 11/1997 | Morin et al. |
| 5,692,925 A | 12/1997 | Bogese, II |
| 5,700,157 A | 12/1997 | Chung |
| 5,704,802 A | 1/1998 | Loudermilk |
| 5,741,152 A | 4/1998 | Boutros |
| 5,764,043 A | 6/1998 | Czosnowski et al. |
| 5,782,757 A | 7/1998 | Diab et al. |
| 5,797,767 A | 8/1998 | Schell |
| 5,821,510 A | 10/1998 | Cohen et al. |
| 5,842,045 A | 11/1998 | Nakamura |
| 5,847,557 A | 12/1998 | Fincher et al. |
| 5,854,824 A | 12/1998 | Bengal et al. |
| 5,876,239 A | 3/1999 | Morin et al. |
| 5,876,240 A | 3/1999 | Derstine et al. |
| 5,885,100 A | 3/1999 | Talend et al. |
| 5,910,776 A | 6/1999 | Black ................... 340/825.35 |
| 5,914,862 A | 6/1999 | Ferguson et al. |
| 5,915,993 A | 6/1999 | Belopolsky et al. |
| 5,924,889 A | 7/1999 | Wang |
| 5,934,925 A | 8/1999 | Tobler et al. |
| 5,984,731 A | 11/1999 | Laity |
| 5,995,006 A | 11/1999 | Walsh |
| 5,995,855 A | 11/1999 | Kiani et al. |
| 5,999,400 A | 12/1999 | Belopolsky et al. |
| 6,002,331 A | 12/1999 | Laor ........................ 340/539 |
| 6,025,725 A | 2/2000 | Gershenfeld et al. |
| 6,068,627 A | 5/2000 | Orszulak et al. |
| 6,095,851 A | 8/2000 | Laity et al. |
| 6,095,869 A | 8/2000 | Wang |
| 6,100,804 A | 8/2000 | Brady et al. |
| 6,102,741 A | 8/2000 | Boutros et al. |
| 6,113,422 A | 9/2000 | Somerville et al. |
| 6,116,946 A | 9/2000 | Lewis et al. |
| 6,116,962 A | 9/2000 | Laity |
| 6,118,379 A | 9/2000 | Kodukula et al. |
| 6,120,318 A | 9/2000 | Reed et al. |
| 6,126,610 A | 10/2000 | Rich et al. |
| 6,127,929 A | 10/2000 | Roz |
| 6,133,835 A | 10/2000 | De Leeuw et al. |
| 6,142,822 A | 11/2000 | Wu |
| 6,152,762 A | 11/2000 | Marshall et al. |
| 6,164,551 A | 12/2000 | Altwasser |
| 6,174,194 B1 | 1/2001 | Bleicher et al. |
| 6,217,371 B1 | 4/2001 | Wu |
| 6,222,908 B1 | 4/2001 | Bartolutti et al. |
| 6,222,975 B1 | 4/2001 | Gilbert et al. |
| 6,224,417 B1 | 5/2001 | Belopolsky et al. |
| 6,227,911 B1 | 5/2001 | Boutros et al. |
| 6,232,870 B1 | 5/2001 | Garber et al. |
| 6,234,830 B1 | 5/2001 | Ensz et al. |
| 6,241,550 B1 | 6/2001 | Laity et al. |
| 6,243,654 B1 | 6/2001 | Johnson et al. |
| 6,256,523 B1 | 7/2001 | Diab et al. |
| 6,280,213 B1 | 8/2001 | Tobler et al. |
| 6,285,293 B1 | 9/2001 | German et al. |
| 6,298,255 B1 | 10/2001 | Cordero et al. |
| 6,319,051 B1 | 11/2001 | Chang et al. |
| 6,319,062 B1 | 11/2001 | Ma et al. |
| 6,325,664 B1 | 12/2001 | Someda et al. |
| 6,330,307 B1 | 12/2001 | Bloch et al. |
| 6,349,228 B1 | 2/2002 | Kiani et al. |
| 6,350,148 B1 | 2/2002 | Bartolutti et al. |
| 6,352,446 B2 | 3/2002 | Ezawa et al. |
| 6,354,884 B1 | 3/2002 | Yeh et al. |
| 6,368,155 B1 | 4/2002 | Bassler et al. |
| 6,375,362 B1 | 4/2002 | Heiles et al. |
| 6,377,203 B1 | 4/2002 | Doany |
| 6,378,111 B1 | 4/2002 | Brenner et al. |
| 6,402,743 B1 | 6/2002 | Orszulak et al. |
| 6,409,530 B1 | 6/2002 | Zhao et al. |
| 6,424,263 B1 | 7/2002 | Lee et al. |
| 6,424,315 B1 | 7/2002 | Glenn et al. |
| 6,424,710 B1 | 7/2002 | Bartolutti et al. |
| 6,428,361 B1 | 8/2002 | Imschweiler et al. |
| 6,431,906 B1 | 8/2002 | Belopolsky |
| 6,439,922 B1 | 8/2002 | Laurer et al. |
| 6,456,768 B1 | 9/2002 | Boncek et al. |
| 6,457,993 B1 | 10/2002 | Espenshade |
| 6,464,533 B1 | 10/2002 | Ma et al. |
| 6,469,404 B1 | 10/2002 | Pohjola |
| 6,478,610 B1 | 11/2002 | Zhou et al. |
| 6,478,611 B1 | 11/2002 | Hyland |
| 6,496,113 B2 | 12/2002 | Lee et al. |
| 6,496,382 B1 | 12/2002 | Ferguson et al. |
| 6,499,861 B1 | 12/2002 | German et al. |
| 6,522,308 B1 | 2/2003 | Mathieu |
| 6,522,737 B1 | 2/2003 | Bartolutti et al. |
| 6,541,756 B2 | 4/2003 | Schulz et al. |
| 6,543,940 B2 | 4/2003 | Chu |
| 6,556,761 B1 | 4/2003 | Jennings et al. |
| 6,574,586 B1 | 6/2003 | David et al. |
| 6,577,243 B1 | 6/2003 | Dannenmann et al. |
| 6,580,086 B1 | 6/2003 | Schulz et al. |
| 6,618,022 B2 | 9/2003 | Harvey |
| 6,655,988 B1 | 12/2003 | Simmons et al. |
| 6,663,417 B1 | 12/2003 | Hung |
| 6,684,179 B1 | 1/2004 | David |
| 6,685,701 B2 | 2/2004 | Orszulak et al. |
| 6,688,908 B2 | 2/2004 | Wallace |
| 6,688,910 B1 | 2/2004 | Macauley |
| 6,693,513 B2 | 2/2004 | Tuttle |
| 6,696,952 B2 | 2/2004 | Zirbes |
| 6,725,177 B2 | 4/2004 | David et al. |
| 6,729,910 B2 | 5/2004 | Fuller |
| 6,733,186 B2 | 5/2004 | Pfleger |
| 6,750,643 B2 | 6/2004 | Hwang et al. |
| 6,773,298 B2 | 8/2004 | Gutierrez et al. |
| 6,773,306 B2 | 8/2004 | Plishner |

| | | | | | |
|---|---|---|---|---|---|
| 6,784,802 B1 | 8/2004 | Stanescu ............... 340/687 | 7,243,837 B2 | 7/2007 | Durrant et al. |
| 6,798,956 B2 | 9/2004 | Morrison | 7,247,046 B1 | 7/2007 | Wu |
| 6,808,116 B1 | 10/2004 | Eslambolchi et al. | 7,252,538 B2 | 8/2007 | Garrett et al. |
| 6,829,427 B1 | 12/2004 | Becker | 7,253,735 B2 | 8/2007 | Gengel et al. |
| 6,831,443 B2 | 12/2004 | Liu | 7,265,674 B2 | 9/2007 | Tuttle |
| 6,846,115 B1 | 1/2005 | Shang et al. | 7,275,970 B2 | 10/2007 | Hoshina |
| 6,847,856 B1 | 1/2005 | Bohannon ............... 700/115 | 7,285,007 B2 | 10/2007 | Barna |
| 6,857,897 B2 | 2/2005 | Conn | 7,294,786 B2 | 11/2007 | Aldereguia et al. |
| 6,866,424 B2 | 3/2005 | Tanaka et al. | 7,297,018 B2 | 11/2007 | Caveney et al. |
| 6,871,156 B2 | 3/2005 | Wallace et al. | 7,297,028 B2 | 11/2007 | Daikuhara et al. |
| 6,881,096 B2 | 4/2005 | Brown et al. | 7,298,266 B2 | 11/2007 | Forster |
| 6,888,996 B2 | 5/2005 | Hwang et al. | 7,298,330 B2 | 11/2007 | Forster |
| 6,890,197 B2 | 5/2005 | Liebenow | 7,298,946 B2 | 11/2007 | Mueller |
| 6,896,542 B2 | 5/2005 | Chang | 7,306,489 B2 | 12/2007 | Werthman et al. |
| 6,898,368 B2 | 5/2005 | Colombo et al. | 7,307,408 B2 | 12/2007 | Porcu et al. |
| 6,900,629 B2 | 5/2005 | Hwang et al. | 7,318,744 B2 | 1/2008 | Kuo |
| 6,902,433 B1 | 6/2005 | Hashimoto et al. | 7,319,397 B2 | 1/2008 | Chung et al. |
| 6,910,917 B2 | 6/2005 | Chen | 7,327,278 B2 | 2/2008 | Dannenmann et al. |
| 6,913,481 B2 | 7/2005 | Marshall et al. | 7,336,883 B2 | 2/2008 | Scholtz |
| 6,915,050 B2 | 7/2005 | Koyasu et al. | 7,349,605 B2 | 3/2008 | Noonan et al. |
| 6,917,763 B1 | 7/2005 | Au et al. | 7,352,285 B2 | 4/2008 | Sakama et al. |
| 6,921,284 B2 | 7/2005 | Sirichai et al. | 7,352,289 B1 | 4/2008 | Harris |
| 6,923,689 B2 | 8/2005 | Xue et al. | 7,354,298 B2 | 4/2008 | James |
| 6,924,997 B2 | 8/2005 | Chen et al. ............... 365/145 | 7,356,208 B2 | 4/2008 | Becker |
| 6,961,675 B2 | 11/2005 | David | 2001/0008390 A1 | 7/2001 | Berquist et al. |
| 6,968,994 B1 | 11/2005 | Ashwood Smith | 2001/0027055 A1 | 10/2001 | Laity et al. |
| 6,971,895 B2 | 12/2005 | Sago et al. | 2001/0039140 A1 | 11/2001 | Fasold et al. |
| 6,973,243 B2 | 12/2005 | Koyasu et al. | 2002/0071394 A1 | 6/2002 | Koziy et al. |
| 6,975,242 B2 | 12/2005 | Dannenmann et al. | 2002/0086584 A1 | 7/2002 | Liu |
| 6,979,223 B2 | 12/2005 | Chen | 2002/0090858 A1 | 7/2002 | Caveney |
| 6,999,028 B2 | 2/2006 | Egbert | 2002/0092347 A1 | 7/2002 | Niekerk et al. ............ 73/146.2 |
| 7,014,100 B2 | 3/2006 | Zierolf | 2003/0021580 A1 | 1/2003 | Matthews |
| 7,014,500 B2 | 3/2006 | Belesimo | 2003/0061393 A1 | 3/2003 | Steegmans et al. |
| 7,016,726 B1 | 3/2006 | Picardo et al. | 2003/0100217 A1 | 5/2003 | Wu |
| 7,018,242 B2 | 3/2006 | Brown et al. | 2003/0100218 A1 | 5/2003 | Tsai et al. |
| 7,024,089 B2 | 4/2006 | Weinert et al. | 2003/0148654 A1 | 8/2003 | Kan |
| 7,027,704 B2 | 4/2006 | Frohlich et al. | 2003/0154273 A1 | 8/2003 | Caveney |
| 7,028,087 B2 | 4/2006 | Caveney | 2003/0154276 A1 | 8/2003 | Caveney |
| 7,028,202 B2 | 4/2006 | Long et al. | 2003/0162414 A1 | 8/2003 | Schulz et al. |
| 7,038,135 B1 | 5/2006 | Chan et al. | 2003/0211782 A1 | 11/2003 | Esparaz et al. |
| 7,044,949 B2 | 5/2006 | Orszulak et al. | 2004/0041714 A1 | 3/2004 | Forster ............... 340/870.17 |
| 7,046,899 B2 | 5/2006 | Colombo et al. | 2004/0114879 A1 | 6/2004 | Hiereth et al. |
| 7,062,139 B2 | 6/2006 | Shang | 2004/0117515 A1 | 6/2004 | Sago et al. |
| 7,068,912 B1 | 6/2006 | Becker | 2004/0123998 A1* | 7/2004 | Berglund et al. ............ 174/92 |
| 7,069,345 B2 | 6/2006 | Shteyn | 2004/0149736 A1 | 8/2004 | Clothier ............... 219/627 |
| 7,080,945 B2 | 7/2006 | Colombo et al. | 2004/0184747 A1 | 9/2004 | Koyasu et al. |
| 7,081,808 B2 | 7/2006 | Colombo et al. | 2004/0253874 A1 | 12/2004 | Plishner |
| 7,096,077 B2 | 8/2006 | Price et al. | 2005/0032415 A1 | 2/2005 | Sakamoto |
| 7,102,520 B2 | 9/2006 | Liu et al. | 2005/0052174 A1 | 3/2005 | Angelo et al. |
| 7,123,810 B2 | 10/2006 | Parrish | 2005/0052287 A1 | 3/2005 | Whitesmith et al. .... 340/825.72 |
| 7,132,641 B2 | 11/2006 | Schulz et al. | 2005/0068179 A1 | 3/2005 | Roesner ............... 340/572.1 |
| 7,140,782 B2 | 11/2006 | Frohlich et al. | 2005/0076982 A1 | 4/2005 | Metcalf et al. ........... 152/152.1 |
| 7,151,455 B2 | 12/2006 | Lindsay et al. | 2005/0093677 A1 | 5/2005 | Forster et al. |
| 7,158,031 B2 | 1/2007 | Tuttle | 2005/0111491 A1 | 5/2005 | Caveney |
| 7,158,033 B2 | 1/2007 | Forster | 2005/0215119 A1 | 9/2005 | Kaneko |
| 7,160,143 B2 | 1/2007 | David et al. | 2005/0224585 A1 | 10/2005 | Durrant et al. |
| 7,165,728 B2 | 1/2007 | Durrant et al. ............ 235/492 | 2005/0231325 A1 | 10/2005 | Durrant et al. |
| 7,168,975 B2 | 1/2007 | Kuo | 2005/0232636 A1 | 10/2005 | Durrant et al. |
| 7,170,393 B2 | 1/2007 | Martin | 2005/0259930 A1 | 11/2005 | Elkins et al. ............... 385/100 |
| 7,173,345 B2 | 2/2007 | Brandt et al. | 2005/0260884 A1 | 11/2005 | Yueh |
| 7,193,422 B2 | 3/2007 | Velleca et al. | 2005/0280511 A1 | 12/2005 | Yokoyama et al. |
| 7,194,180 B2 | 3/2007 | Becker | 2006/0039136 A1 | 2/2006 | Probasco et al. |
| 7,205,898 B2 | 4/2007 | Dixon et al. | 2006/0044148 A1 | 3/2006 | Daniels et al. |
| 7,207,846 B2 | 4/2007 | Caveney et al. | 2006/0091207 A1 | 5/2006 | Chang |
| 7,210,858 B2 | 5/2007 | Sago et al | 2006/0148279 A1 | 7/2006 | German et al. |
| 7,217,152 B1 | 5/2007 | Xin et al. | 2006/0153517 A1 | 7/2006 | Reagan et al. |
| 7,221,277 B2 | 5/2007 | Caron et al. | 2006/0166546 A1 | 7/2006 | Ashizawa et al. |
| 7,221,284 B2 | 5/2007 | Scherer et al. | 2006/0206246 A1 | 9/2006 | Walker |
| 7,224,278 B2 | 5/2007 | Phaneuf et al. | 2006/0232419 A1 | 10/2006 | Tomioka et al. |
| 7,224,280 B2 | 5/2007 | Ferguson et al. | 2006/0233506 A1 | 10/2006 | Noonan et al. ............... 385/134 |
| 7,226,217 B1 | 6/2007 | Benton et al. | 2006/0257092 A1 | 11/2006 | Lu et al. |
| 7,233,250 B2 | 6/2007 | Forster | 2006/0267778 A1 | 11/2006 | Gengel et al. |
| 7,234,944 B2 | 6/2007 | Nordin et al. | 2006/0275007 A1 | 12/2006 | Livingston et al. |

| | | | | | | |
|---|---|---|---|---|---|---|
| 2006/0282529 | A1 | 12/2006 | Nordin | JP | 2004-142500 | 5/2004 |
| 2006/0286856 | A1 | 12/2006 | Sakamoto | JP | 2004-152543 | 5/2004 |
| 2007/0013487 | A1 | 1/2007 | Scholtz et al. | JP | 2004-245963 | 9/2004 |
| 2007/0015410 | A1 | 1/2007 | Siemon et al. | JP | 2004-247090 | 9/2004 |
| 2007/0023525 | A1 | 2/2007 | Son et al. | JP | 2004-247134 | 9/2004 |
| 2007/0032124 | A1 | 2/2007 | Nordin et al. | JP | 2004-264901 | 9/2004 |
| 2007/0059975 | A1 | 3/2007 | Walsh | JP | 2004-265624 | 9/2004 |
| 2007/0117450 | A1 | 5/2007 | Truxes | JP | 2004-265860 | 9/2004 |
| 2007/0120684 | A1 | 5/2007 | Utaka et al. | JP | 2004-265861 | 9/2004 |
| 2007/0152828 | A1 | 7/2007 | Mohalik | JP | 2004-266886 | 9/2004 |
| 2007/0155223 | A1 | 7/2007 | Huang et al. | JP | 2004-317737 | 11/2004 |
| 2007/0196058 | A1 | 8/2007 | Lee et al. | JP | 2004-349184 | 12/2004 |
| 2007/0205897 | A1 | 9/2007 | Forster | JP | 2005-018175 | 1/2005 |
| 2007/0216534 | A1 | 9/2007 | Ferguson et al. | JP | 2005-033857 | 2/2005 |
| 2007/0236355 | A1 | 10/2007 | Flaster et al. | JP | 2005-050581 | 2/2005 |
| 2007/0238343 | A1 | 10/2007 | Velleca et al. | JP | 2005-084162 | 3/2005 |
| 2007/0241439 | A1 | 10/2007 | Chung et al. | JP | 2005-086901 | 3/2005 |
| 2007/0247284 | A1 | 10/2007 | Martin et al. | JP | 2005-087135 | 4/2005 |
| 2008/0003867 | A1 | 1/2008 | Wu | JP | 2005-092107 | 4/2005 |
| 2008/0021766 | A1 | 1/2008 | McElwaine et al. | JP | 2005-134125 | 5/2005 |
| 2008/0032546 | A1 | 2/2008 | Xuan et al. | JP | 2005-216698 | 8/2005 |
| 2008/0045075 | A1 | 2/2008 | Caveney et al. | JP | 2005-302403 | 10/2005 |
| 2008/0090451 | A1 | 4/2008 | Feldman | JP | 2005-315980 | 11/2005 |
| 2008/0106415 | A1 | 5/2008 | Sellew et al. | JP | 2005-339983 | 12/2005 |
| 2008/0139306 | A1 | 6/2008 | Lutnick et al. | JP | 2006-054118 | 2/2006 |
| | | | | JP | 2006-245983 | 9/2006 |
| | | | | JP | 2006-279650 | 10/2006 |
| | | | | JP | 2007-087849 | 4/2007 |
| | | | | JP | 2007-088957 | 4/2007 |
| | | | | JP | 2007-158993 | 6/2007 |
| | | | | JP | 2007-189774 | 7/2007 |
| | | | | JP | 2007-221400 | 8/2007 |
| | | | | WO | 03/098175 A1 | 11/2003 |
| | | | | WO | 2004/030154 A2 | 4/2004 |
| | | | | WO | WO 2004061511 A2 | 7/2004 |
| | | | | WO | 2005/069203 A2 | 7/2005 |
| | | | | WO | 2005/069203 A3 | 7/2005 |
| | | | | WO | WO 2008000656 A1 | 1/2008 |

FOREIGN PATENT DOCUMENTS

| | | |
|---|---|---|
| DE | 19920452 | 11/2000 |
| DE | 102 44 304 B3 | 3/2004 |
| DE | 10249414 A1 | 5/2004 |
| DE | 10 2006 030 077 A1 | 1/2008 |
| EP | 1455550 A2 | 3/2004 |
| EP | 1 696 680 B1 | 4/2008 |
| GB | 2 347 508 A | 9/2000 |
| GB | 2371211 A | 7/2002 |
| JP | 03-242795 | 10/1991 |
| JP | 04-039483 | 2/1992 |
| JP | 04-174406 | 6/1992 |
| JP | 2001-099946 | 4/2001 |
| JP | 2002-264617 | 9/2002 |
| JP | 2003-148653 | 5/2003 |
| JP | 2003-172827 | 6/2003 |
| JP | 2003-229215 | 8/2003 |
| JP | 2004-039389 | 2/2004 |

OTHER PUBLICATIONS

Patent Cooperation Treaty, International Search Report for International Application No. PCT/US07/22911, May 9, 2008, 1 page.

* cited by examiner

RADIO FREQUENCY IDENTIFICATION OF COMPONENT CONNECTIONS

FIELD OF THE INVENTION

The present invention relates generally to use of Radio Frequency Identification (RFID) devices with two or more connectable components. More particularly, the present invention relates to the use of one or more RFID transponders to identify a connection of two or more components, such as components of telecommunications equipment.

BACKGROUND OF THE INVENTION

Fiber optic cables are well known for connecting optical devices and systems. Some cables carry multiple fibers and have one or more plugs, such as connectors. "Pre-connectorized" cables have their connectors attached during manufacture, while others are terminated and have connectors attached upon installation. Cables known as patch cables, jumper cables, and break out cables are often relatively short and have one or more connectors at each end. In use, each connector will be placed within a port located in a piece of equipment, patch panel, another connector, etc.

As fiber optic equipment and networks become more common and more complex, the identification of proper plugs and sockets (into which the plugs are mated) for setting up and maintaining the systems accordingly becomes more complex. Therefore, indicia such as labels, hang tags, marking, coloration, and striping have been used to help identify specific fibers, cables, plugs, and/or sockets. While such indicia have been helpful in providing information to the craftsman setting up or servicing a system, further improvement could be achieved.

RFID systems have therefore been applied to fiber optic systems to provide information regarding fibers, plugs, and sockets. For example, RFID transponders (comprising an antenna and an RFID integrated circuit chip) have been attached to plugs and sockets for use in identification. The RFID integrated circuit chip stores information for RF communication. Typically, these RFID transponders have been passive, rather than active, so they communicate (by transmitting, reflecting, modifying, or otherwise sending RF signals) the stored information responsive to interrogation by an RF signal received by the RFID transponder antenna. An RFID reader comprising a transceiver that sends an RF signal to the RFID transponders and reads the responsive RF signals communicated by the RFID transponders could then interrogate the RFID transponders to determine stored information about the cable, plug, and/or socket. In some fiber optic connector systems, an RFID transceiver antenna is located near the socket for detecting an RFID transponder attached to the inserted plug, and the transceiver antenna further is connected to the remainder of the transceiver via wiring.

The various systems above generally rely upon a certain degree of proximity for operation. That is, the reader in the system would identify nearby RFID transponders, or would identify pairs of transponders close together (for example, on a plug and on a socket holding the plug), all within the read range of the reader. The read range could be designed to be small, for example for rows of readers mounted on adjacent sockets for reading only an inserted plug's RFID signal. Alternatively, the read range could be much larger, for example for handheld or room-size readers for reading multiple signals from one or more pieces of equipment.

However, such RFID systems have certain drawbacks. For example, the operation of such systems is dependent upon the relative proximity to a targeted item, which can lead to either difficult or inaccurate results, as signals may be received and/or communicated by unintended RFID transponders on items near the targeted item. Accordingly, the read range of a given RFID reader, whether incorporated into the socket housing or remote, can be a limiting factor. Further, if a plug were only partially inserted into a socket so as not to make a functional connection with the optical fiber(s), the RFID antennas in the plug and/or socket might inaccurately indicate the connection were made due to the proximity between the plug and the socket.

Moreover, when dealing with an entire panel of connectorized cables and sockets, it may not be practical or even possible to rely upon proximity, either plug-to-socket or reader-to-transponder, as a method of querying a targeted RFID transponder. In fact, the RFID transponders across the entire panel could respond to an RFID reader in certain situations, thereby providing no useful information as to identification of individual plugs and/or sockets of interest.

In such situations, a craftsman may need to separate a plug from the socket and panel to obtain information from the RFID transponder of the plug or socket, thereby breaking the fiber optic connection in the process. Such action adds a step to the process of identification in terms of unplugging or at least re-orienting objects in a certain way to avoid "false" readings from the panel due to proximity issues. Also, it may be necessary to disconnect the optical fiber plugs, possibly one after another, until a targeted optical fiber is found. Such serial disconnection can be even more undesirable when equipment is operating and disconnections cause problems for the users of the systems. In such cases, the whole system may have to be shut down just to allow for the identification of a single cable, even if sophisticated RFID equipment is in place. The process becomes more complex when extended to entire networks including multiple equipment housings, cables, etc., perhaps spread throughout a building.

It can also be difficult for the craftsman in the field to determine how or why a plug, cable, socket, or the like has failed or otherwise needs replacing. Again, identification of a single item within a group can be difficult, as well as identifying conditions leading to a particular issue. Conditions causing the problem could be transitory and no longer apparent or in effect when the craftsman arrives for service. Accordingly, providing more information to the craftsman for purposes of identification, troubleshooting, service, warranty, etc. would also be useful.

Therefore, a need exists for RFID technology that provides simple, reliable, and/or unobtrusive identification of one or more components and mapping of networks of components, including identification of location and past and/or present condition.

SUMMARY OF THE INVENTION

According to certain embodiments of the present invention, a system of identifying, via an RFID reader, a connection of two or more components is provided. The system includes a plug associated with a first component and a socket associated with the second component, and a pair of contact points is associated with at least one of the plug and socket. A plug RFID transponder is associated with the plug, and a socket RFID transponder is associated with the socket. One or both of the plug RFID transponder and the socket RFID transponder is activatable when the plug is received by the socket such that a portion of the respective plug RFID transponder and the socket RFID transponder contact the pair of contact points. The RFID reader is able to identify the plug and socket based upon an RFID signal communicated by the plug RFID transponder and/or the socket RFID transponder. Further embodiments of the present invention that may or may not include the pair of contact points also include a condition responsive device associated with either the plug or the socket and a condition generating device associated with the other of the plug or socket such that at least one of the plug RFID transponder and the socket RFID transponder is activatable when the condition responsive device detects the condition generated by the condition generating device. The condition generated by the condition generating device may relate to receipt of the plug into the socket and/or relate to a certain voltage and/or current generated by the condition generating device and detected by the condition responsive device. Still further embodiments of the present invention include a plug RFID transponder and/or a socket RFID transponder adapted to identify the other of the plug RFID transponder and the socket RFID transponder to selectively communicate the identity of both RFID transponders.

Alternative embodiments of the present invention comprise a plug associated with a first component of telecommunications equipment, such as a fiber optic connector, and a socket associated with a second component of telecommunications equipment, such as a fiber optic adapter. A plug RFID integrated circuit chip is associated with the plug, a socket RFID integrated circuit chip is associated with the socket, and at least one RFID antenna is associated with the socket. A plug RFID transponder and/or a socket RFID transponder is defined when the plug is received by the socket to define an activatable passive RFID transponder adapted to communicate the identity of the connection between the first component of telecommunications equipment and the second component of telecommunications equipment.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate the various exemplary embodiments of the invention, and together with the description serve to explain the principals and operations of the invention.

DETAILED DESCRIPTION OF THE INVENTION

Figure 1:
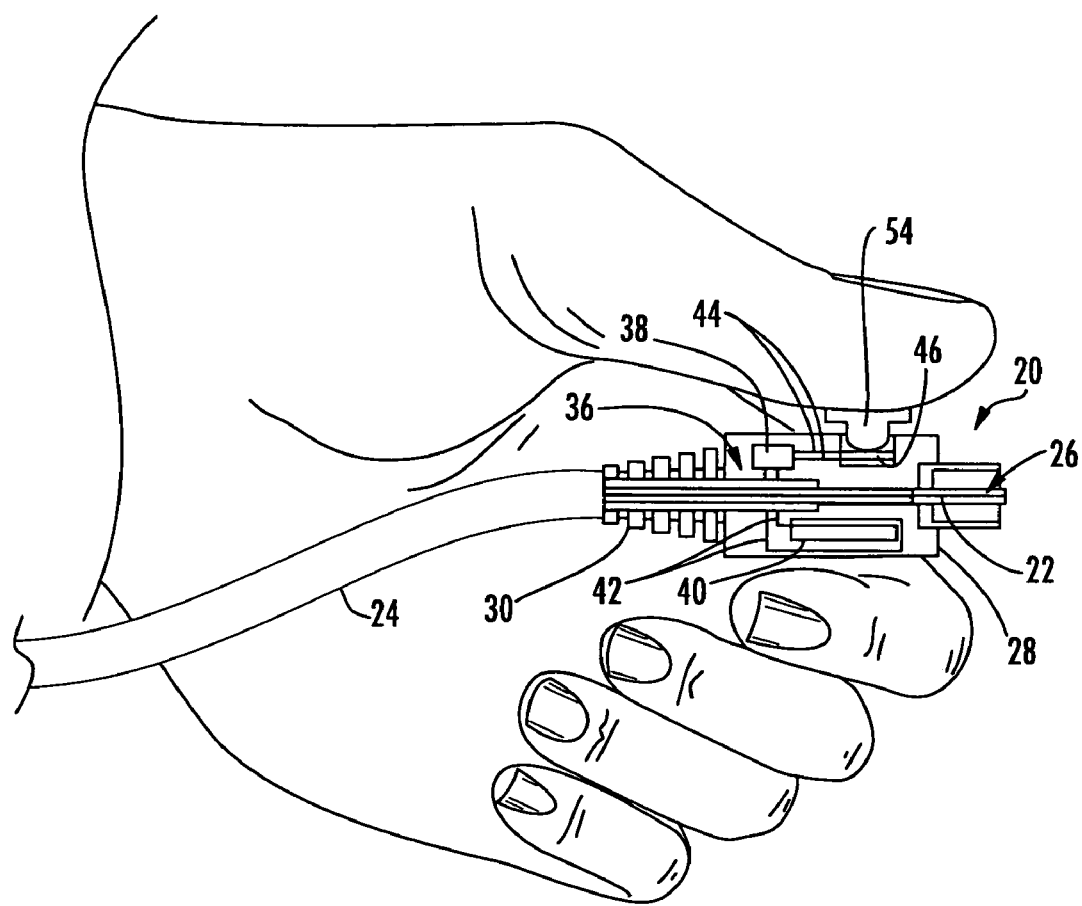
FIG. 1 is a representative schematic view of a plug according to certain embodiments of the invention including a condition responsive device operable via a push button.

Reference will now be made in detail to the present preferred embodiments of the invention, examples of which are illustrated in the accompanying drawings. Whenever possible, like or similar reference numerals will be used throughout the drawings to refer to like or similar parts. The exemplary embodiments of the invention employ RFID technology to allow for simple, reliable, and/or unobtrusive identification of one or more components, including identification of location and past and/or present condition. It should be understood that the embodiments disclosed herein are merely examples, each incorporating certain benefits of the present invention. Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

As broadly embodied in FIGS. 1-15 examples of connectors, connector assemblies, cables, and mapping systems are disclosed, in which RFID technologies are employed, along with one or more condition responsive devices in certain embodiments of the present invention. As discussed more fully below, the RFID technologies can be configured in different ways, resulting in different functionalities according to the invention. In addition, complete RFID transponders and/or portions of RFID transponders may be located on a plug (such as a connector), a socket (such as an adapter), a housing, a separate object, or other components (or portions thereof). The condition responsive devices are responsive to one or more conditions and/or change in condition such as a state of contact, electrical contact closure, temperature, pressure, humidity, light, or capacitance (and/or impedance). The condition responsive device may be user-operated, for example by pressing a push button or connecting or disconnecting a plug from a socket, or the condition responsive device may be a passively operated sensor, or both could be employed together. Further, the condition and/or change in condition indicated by the condition responsive device may permit or preclude operation of a given RFID transponder. Alternatively, such condition and/or change in condition may simply be registered and/or reported by the RFID transponder without altering the operational status of the RFID transponder. It should also be understood that elements of the embodiments below may be mixed in different ways to achieve still further embodiments and functionality within the scope of the invention. Although the illustrated embodiments of the present invention are directed to passive RFID transponders, further embodiments include one or more active RFID transponders depending upon the particular functionality of the RFID transponder system desired.

Although the embodiments of the present invention described herein are directed to RFID systems used with components of telecommunications equipment, such as fiber optic connectors and adapters or copper connector and adapters and other fiber optic and/or copper components, further embodiments of the present invention are used with non-telecommunications equipment, particularly regarding components that interconnect and/or are exposed to various conditions for which it is desirable to know the location, connectivity, and/or conditions of the components. The terms plug and socket are generally used herein to define portions of components that are adapted for connecting to one another, such as a connector that is received by an adapter, and are not necessarily limited to standard plugs and sockets.

Figure 2:
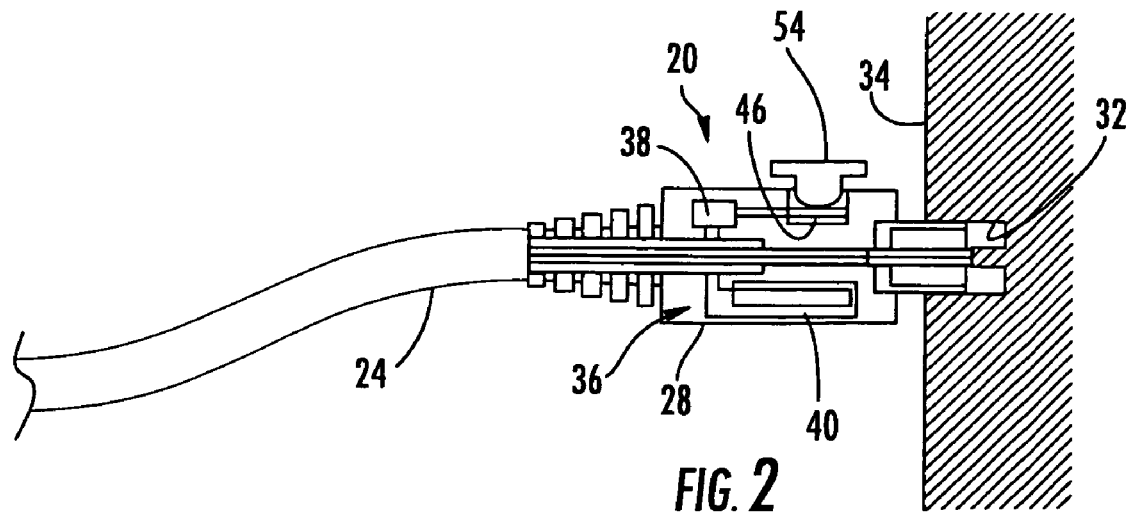
FIG. 2 is a schematic view of the plug of FIG. 1 as inserted in a socket.
Figure 3:
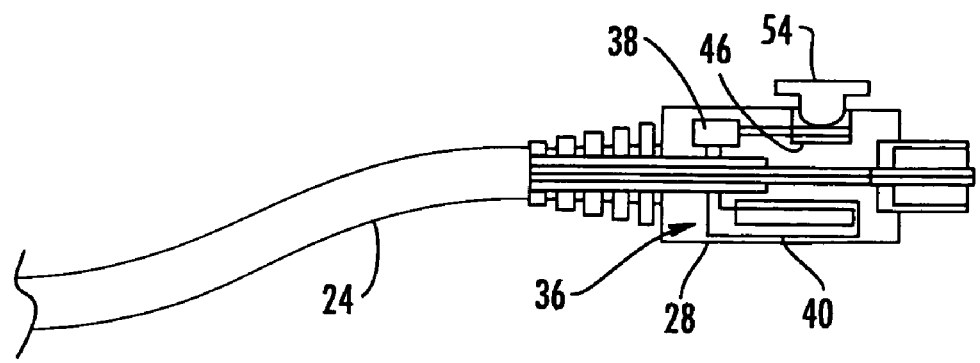
FIG. 3 is a schematic view of a plug as in FIG. 1, wherein the plug defines an fiber optic connector.

FIGS. 1-3 show one example of a plug, such as connector 20, for terminating an optical fiber 22. The plugs of further embodiments of the present invention include alternative types of connectors such as MT, MJ, RJ, SC, LC, etc., as well as connector fanout assemblies, housings for protectively sealing the connector-adapter interface, and the like. As shown in FIGS. 1-3, fiber 22 is located within an end of cable 24. Fiber 22 is terminated at ferrule 26 located within body 28 of connector 20. Strain relief 30 is provided at one end of body 28 to protect fiber 22. Cable 24 may or may not be pre-connectorized. Connector 20 may be inserted into a socket, such as adapter 32, within a housing 34. Again, adapter 32 and housing 34 are illustrative only, and any type of socket disposed in a component can be employed according to the present invention.

As shown, an RFID transponder 36 is attached to body 28. Therefore, the RFID transponder is associated with the plug. The RFID transponder is associated with a plug, socket, component, or the like of the present invention when the RFID transponder or a portion thereof, is position on or adjacent to the respective plug, socket, component, or the like such that the RFID transponder, when activated, is capable of communicating the identity and/or general location of the associated plug, socket, component, or the like such that an RFID reader is able to ascertain the identity and/or general location of the associated plug, socket, component, or the like. The RFID transponder 36 illustrated in FIGS. 1-3 includes an RFID integrated circuit chip 38 and an RFID antenna 40 electrically connected by wiring 42. RFID transponder 36 may be in the form of an RFID tag. If desired, RFID transponder 36 may be embedded within body 28, or it may be attached to the inside or outside of the body, such that the RFID transponder is associated with the connector 20.

Additional wiring 44 electrically connects RFID integrated circuit chip 38 to a condition responsive device 46 mounted on or within (as shown) body 28 of connector 20. Condition responsive device 46 is capable of detecting at least one condition and/or change of condition and providing a signal to RFID transponder 36 responsive to the detected condition. In some embodiments of the present invention, RFID transponder 36 and/or condition responsive device 46 are selectively activatable and, when activatable, may be activated when interrogated by an RFID reader to communicate a signal representative of the detected condition. Further embodiments of the present invention comprise RFID transponders and/or condition responsive devices that are activatable when the associated component is in physical contact with a technician and/or mating component; while still further embodiments comprise RFID transponders and/or condition responsive devices that are continuously activatable.

Activation may be accomplished via an RFID reader (not shown), having its own RFID circuitry and RFID antenna, which may or may not also be located on an integrated circuit chip as in RFID transponder 36 of some embodiments of the present invention. The RFID reader along with an associated database and processing element, in accordance with some embodiments of the invention, comprise portions of an RFID system for identifying a plurality of components, as described more fully below. The RFID reader and/or its associated elements may be a separate device from the component that includes adapter 32, such as a handheld RFID reader or an RFID reader disposed somewhere on the premises within the RFID read range of the components being monitored, depending on the desired application and functionality. Alternatively, an RFID reader may be located on a housing of a component, such as the type in FIG. 2 that holds adapter 32, and may be either associated with or spaced apart from adapter 32. One RFID reader, whether in a remote housing or associated with the component comprising the adapter, may be used to interact with multiple RFID transponders. It should be understood that certain aspects of the invention are directed to connector and RFID transponder designs alone, for use with one or more RFID readers, while in other aspects, the invention is directed to the combination of the RFID transponder(s), RFID reader(s), and/or components associated with the RFID transponder(s).

RFID integrated circuit chip 38 may include stored information such as serial number, type of connector, cable type, manufacturer, manufacturing date, installation date, location, lot number, performance parameters (such as attenuation measured during installation), identification of what is at other end of the cable, etc. Such information could be pre-loaded on RFID integrated circuit chip 38 at manufacture or upon installation via an RFID reader. Furthermore, the RFID reader, and any associated database and/or processing element, of certain embodiments of the present invention includes stored information relating to one or more RFID transponder and/or components in order to facilitate identification, mapping, or other processing of the information received from one or more RFID transponders. More specifically, the RFID reader includes information that correlates a unique identification number of an RFID transponder to a particular plug and/or socket, to a particular component (such as a fiber optic cable assembly with one or more connectors), to other portions of the component (such as correlating a first connector of a fiber optic cable to a second connector, or grouping multiple adapters of a patch panel, etc.), to past and/or current mating components, and any other parameter, connection, association, or other information that a technician may want know or record when working with and/or monitoring the one or more components.

Some embodiments of the present invention comprise a condition responsive device for detecting a condition relating to the component with which the condition responsive device is associated. Condition responsive device 46 of FIGS. 1-3 comprises a mechanical switch, or more specifically a push button switch, with two electrical contacts. This exemplary embodiment and other similar embodiments of the present invention enable the condition responsive device to detect selective physical contact of the component, or more specifically the plug and/or condition responsive device, by a technician and/or a mating component, such as a socket. Alternatively, the condition responsive device 46 could be a capacitance or impedance sensor, or other mechanical, electrical, or electromechanical sensors. As illustrated, condition responsive device 46 is actuated by a hand-operated push button 54, which may be spring loaded, but other activation structures such as slides, contact sensors, and the like are also provided in further embodiments of the present invention. In alternative embodiments of the present invention, push button 54 can be activated by contact with housing 34 upon insertion of connector 20 into adapter 32. Wiring 44 connects condition responsive device 46 to RFID integrated circuit chip 38 to provide information regarding the condition (such as physical contact by the technician, receipt of the plug into the socket, or the like) detected by the condition responsive device. For example, certain two-position switches define a condition responsive device that detects and provides information regarding the position of the switch. Thus, when activated, RFID transponder 36 would provide information regarding the condition detected by the at least one condition responsive device 46 and may also provide other information, such as identification information relating to the RFID transponder and/or other RFID transponders. A technician could identify a given cable/connector by having an RFID reader (not shown) interrogate a panel full of plug RFID transponders associated with the connectors and then pressing the button on the given cable/connector, and monitoring the output from the RFID reader to look for which cable/connector indicates a certain condition and/or change in condition. Importantly, this could be accomplished if desired without otherwise manipulating, plugging, or unplugging the cable/connector, thus preventing undesirable disconnection of services (albeit temporary) to one or more customers. The RFID transponder 36 of FIGS. 1-3 is configured and wired to always return a signal to RFID reader, regardless of the condition detected by the condition responsive device, although alternative RFID transponders could be altered to turn on and off depending on the condition, as discussed below.

In addition, RFID transponder 36 is adapted to communicate with a similar separate or interrelated RFID transponder or RFID reader (not shown) on housing 34 and/or associated with a respective adapter 32, if desired. The ability of the RFID transponders to communicate with one another, to store information of two or more RFID transponders, and/or communicate with the RFID reader information of two or more RFID transponders is discussed more fully below. Furthermore, the RFID transponders of alternative embodiments selectively assist a technician working with the components associated with the RFID transponders. For example, it would be possible to indicate to the technician which adapter a connector should be received upon the pushing of a button on the connector. RFID transmission from the RFID transponder(s) or the RFID reader could trigger such indication in various ways.

Figure 4:
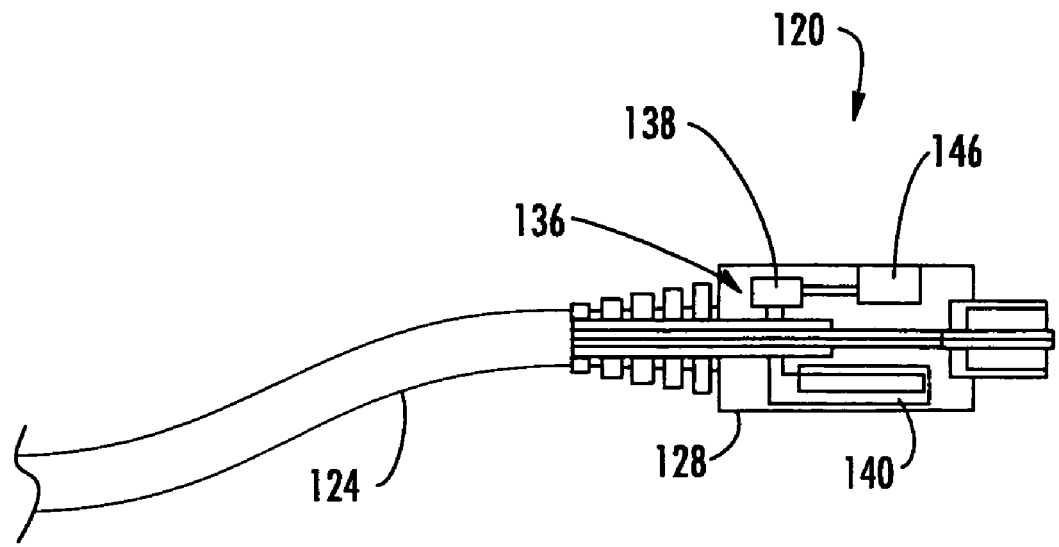
FIG. 4 is a schematic view of an alternate embodiment of a plug including an condition responsive device.

FIG. 4 shows a modified connector 120 in which condition responsive device 146 is activated without a mechanical component such as button 54 of FIGS. 1-3. Condition responsive device 146 could thus comprise an integrated sensor to sense at least one of contact, electrical contact closure, temperature, pressure, humidity, light exposure, capacitance (and/or impedance), or other environmental condition or parameter. It may be more economical to manufacture such a connector 120, wherein the moving parts of a push button are not needed.

The condition responsive device 146 could be configured to detect contact or other input from a technician, by detecting a temperature or lighting change due to gripping or covering the sensor, shining a light or laser on it, etc. In such case, condition responsive device 146 could function as above to indicate two alternative conditions. Further embodiments of the present invention include a condition responsive device 146 that functions to indicate a range of conditions corresponding for example to a present condition, past condition, past high or low conditions, etc. with reference to temperature, humidity, pressure, etc. Such information could be important for detecting and diagnosing problems, and for repair and warranty considerations. Also, such information could be used to communicate via RFID transponder 136 that certain equipment should be shut down (for example in case of contact with liquid or overheating is indicated). For certain of such functions, it may be necessary that condition responsive device 146 include a power source, either within the device itself or externally provided. Also, it may be necessary to include additional features on RFID transponder 136 or in RFID integrated circuit chip 138 to allow multiple functionalities, such as adding multiple bit capability, analog-digital converters, additional wiring connectors, etc.

Figure 5:
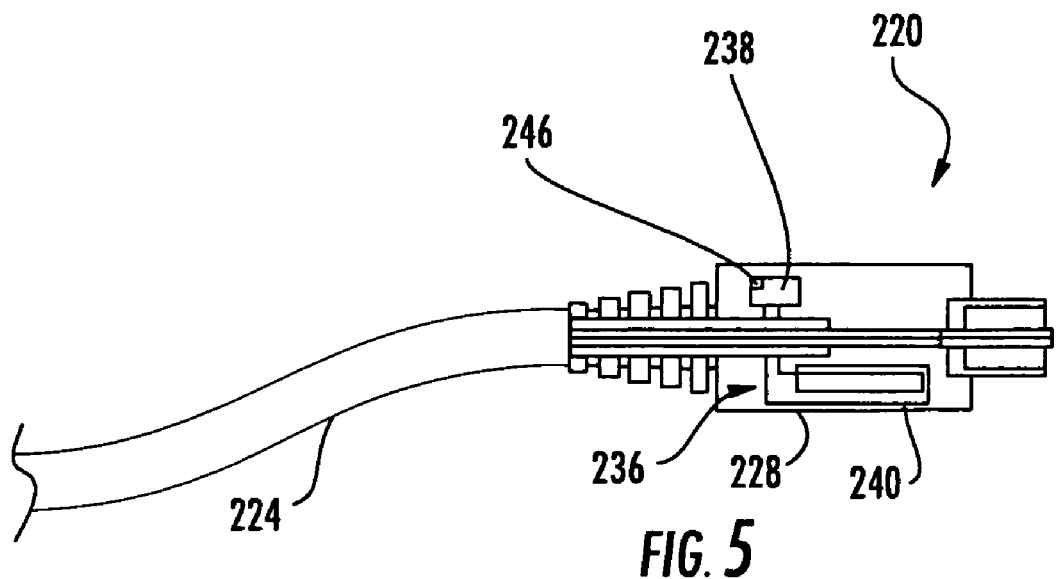
FIG. 5 is a schematic view of another alternate embodiment of a plug including a condition responsive device, wherein the condition responsive device is physically included within the integrated circuit chip of the RFID transponder.

FIG. 5 shows a connector 220 of a further embodiment of the present invention in which a condition responsive device 246 is part of RFID integrated circuit chip 238, again activated without a mechanical component such as button 54 of FIGS. 1-3. By physically including the condition responsive device 246 within the RFID integrated circuit chip 238, the remaining structure is simpler than the structure of FIG. 4, which could provide advantages in manufacturing or use.

Figure 6:
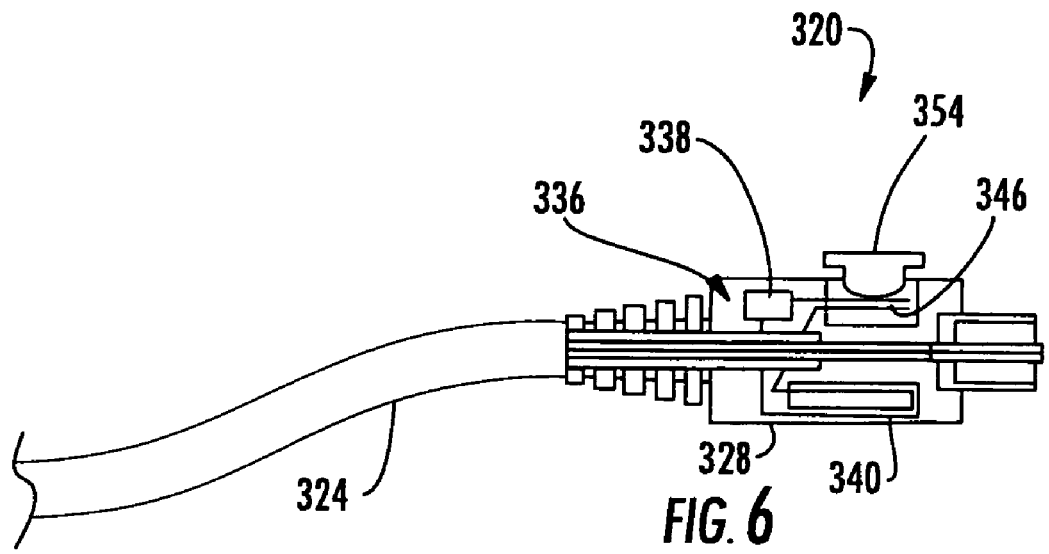
FIG. 6 is a schematic view of another embodiment of a connector including a condition responsive device comprising a push button switch, wherein pushing the button electrically connects and enables the RFID antenna.
Figure 7:
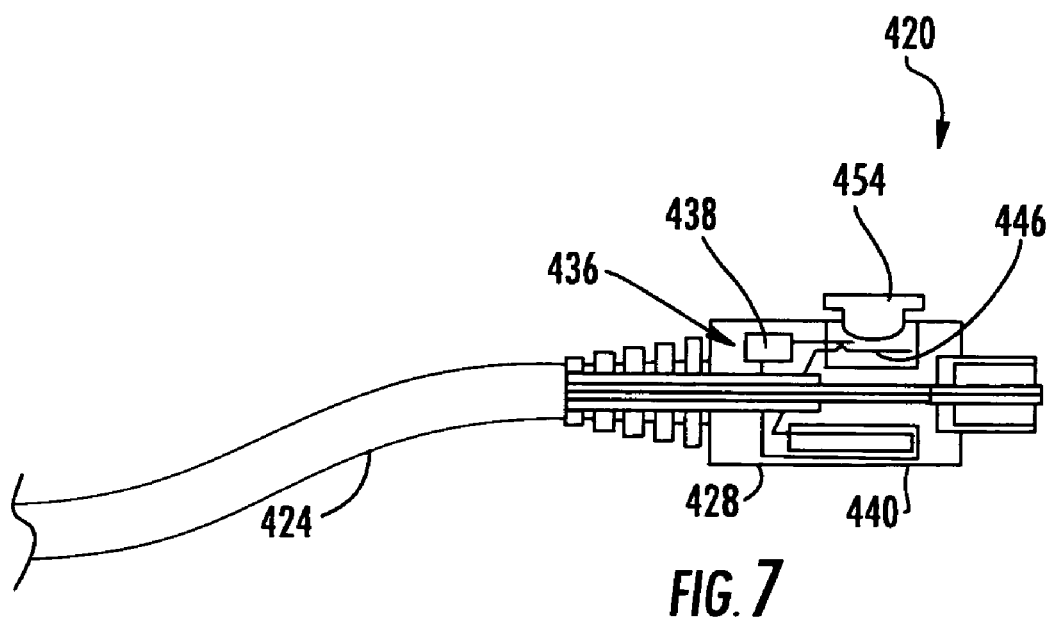
FIG. 7 is a schematic view of yet another embodiment of a connector including a condition responsive device comprising a push button switch, wherein pushing the button electrically disconnects and disables the RFID antenna.

FIG. 6 shows a connector 320 with a condition responsive device 346 that functions to complete an electrical circuit allowing RFID transponder 336 to turn on. That is, unless condition responsive device 346 detects a certain condition, RFID transponder 336 does not operate. As illustrated, push button 354 is provided for activating condition responsive device 346. Therefore, connector 320 could function somewhat like connector 20, whereby when button 354 is pressed a condition change occurs. However, the condition change occurrence is from off to on in FIG. 6, as pressing the push button 354 selectively electrically connects the condition responsive device 346 to the RFID integrated circuit chip 338. FIG. 7 shows another connector 420 with similar but opposite functionality. In connector 420, RFID transponder 436 is on unless it is turned off by the condition responsive device 446, for example by pressing button 454, which selectively electrically disconnects the condition responsive device 446 from the RFID integrated circuit chip 438. Again, the push buttons of FIGS. 1-3, 6, and 7 may be hand operated by a technician or actuated upon insertion of the plugs into the sockets or the like.

It should be understood that use of mechanical condition responsive devices and push buttons with the embodiments of FIGS. 6 and 7 are optional. Thus, the more passive condition responsive devices of FIGS. 4 and 5 in further embodiments of the present invention may also be utilized with the connectors of FIGS. 6 and 7, wherein the RFID transponders are turned on or off by signals resulting from the condition responsive devices. Also, multiple condition responsive devices, both passive and active could be employed. For example, pressing a button could actuate one condition responsive device to activate an RFID transponder, while a past or present temperature condition signal could be obtained from another condition responsive device. Still further embodiments of the present invention include condition responsive devices that detect a condition generated by a condition generating device, as described more fully below.

Figure 8:
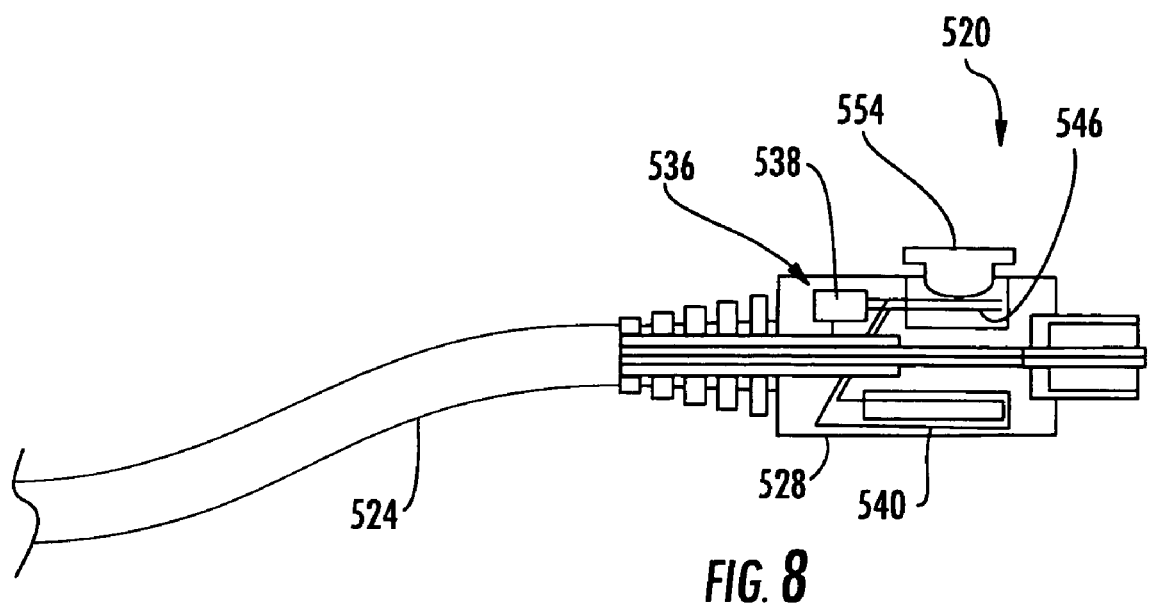
FIG. 8 is a schematic view of still another embodiment of a connector including a condition responsive device, wherein the condition responsive device comprises a variable impedance element.

FIG. 8 shows another alternate connector 520 wherein input from a shunted condition responsive device 546 is provided to RFID integrated circuit chip 538. Condition responsive device 536 could be, for example, a variable impedance element, wherein the condition responsive device varies the impedance by changing the resistance or capacitance (and/or inductance) of the condition responsive device. The variable impedance element may be placed in parallel with or in series with the leads of the RFID antenna 540. Other shunted devices and configurations could be employed for condition responsive devices of further embodiments of the present invention.

FIGS. 9-14 show various embodiments in which RFID functionality is achieved or altered when a connector is inserted into an adapter. In such fashion, the electrical connections and configurations also function as a condition responsive device, akin to those discussed above, in which the insertion of a plug into a socket makes the electrical connection that effects RFID functionality. Further, the plug-in embodiments of FIGS. 9-14 may also be used in conjunction with the concepts and structures discussed above.

Figure 9:
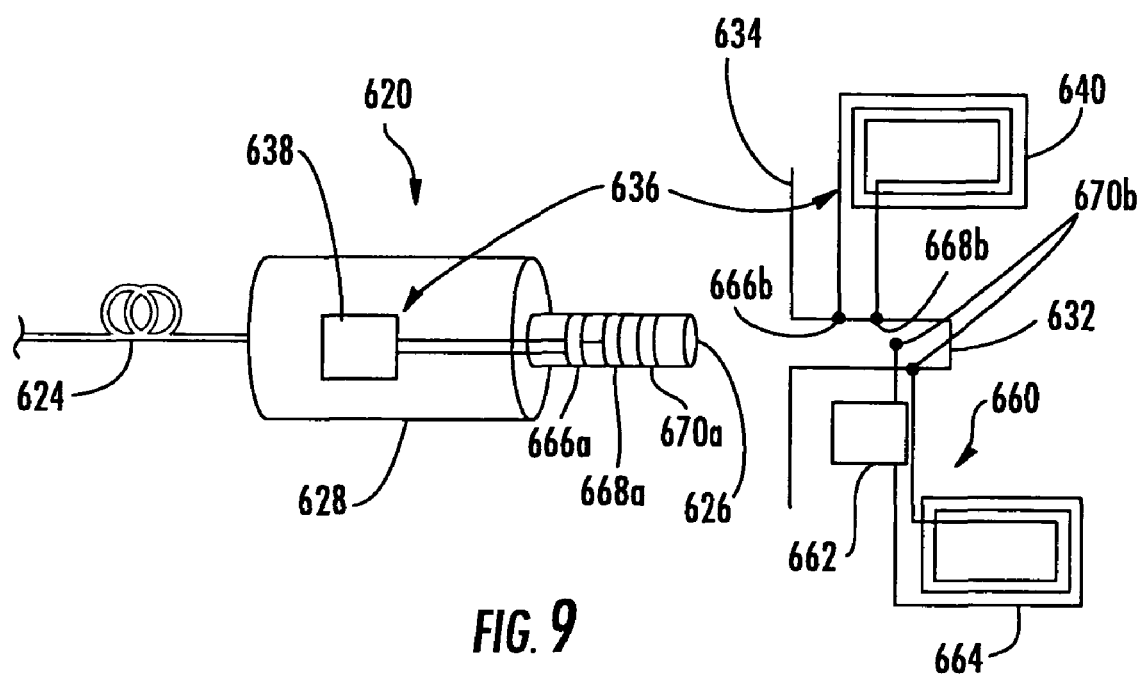
FIG. 9 is a schematic view of an embodiment of a plug having an associated plug RFID transponder and a socket having an associated socket RFID transponder, wherein functionality of the plug RFID transponder and/or the socket RFID transponder is effected by insertion of the plug into the socket.

FIG. 9 shows a connector 620 and adapter 632 whereby each includes an RFID transponder 636 and 660. RFID transponder 636 includes an RFID integrated circuit chip 638 on connector body 628 and an RFID antenna 640 on housing 634. RFID transponder 660 includes an RFID integrated circuit chip 662 and an RFID antenna 664 on housing 634. Pairs of contact points, such as electrical connections 666a, 668a and 670a on connector 620 mate with connections 666b, 668b, and 670b on housing 634. The connections 666-670 are located proximate the ferrule 626 and adapter 632, although such connections could be located on other places on body 628 and housing 634. Also, to prevent the RFID antennas from operating as a monopole when a single contact is made, four sets of connections may be used in some embodiments of the present invention to isolate the antennas.

When connector 620 is received by the adapter 632, electrical contact is made between connections 666a and 666b, 668a and 668b, and 670a and 670b. Thus, the embodiment of the present invention shown in FIG. 9 effectively operates similar to the embodiment of FIG. 7, wherein the RFID transponders 636 and 660 are not functional, unless activated by the receipt of the connector 620 into the adapter 632. Functionally, interrogation will show additional RFID transponders when such connection is made. Also, such structure provides a double check function to ensure that an inserted connector is properly received by the adapter. The structure also beneficially does not rely for such function on the relative location of the connector and housing or adapter, which as mentioned above, can lead to inaccurate results at times in various scenarios.

By placing part of RFID transponder 636 for connector 620 on housing 634, space is saved on the connector, which can be useful in some situations so as to allow for RFID functionality on a relatively smaller connector. Also, such arrangement leaves more room for other structures or condition responsive devices on the connector. If desired, the electrical contacts 670a and 670b could be omitted, allowing the RFID transponder 660 to be functional at all times. Also, RFID transponder 660 could be replaced by a transceiver to provide alternative functionality.

Figure 10:
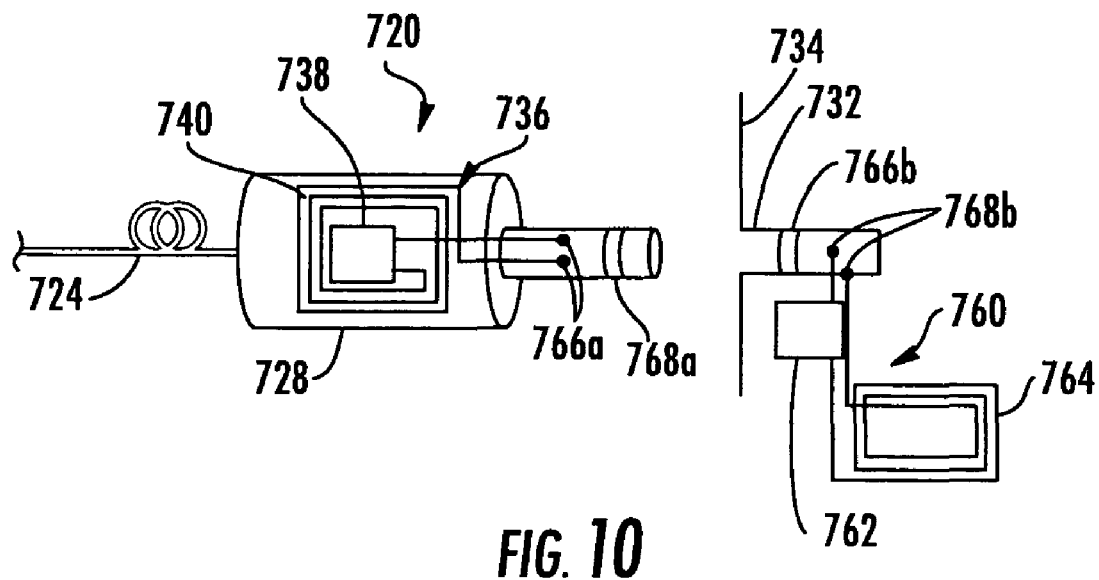
FIG. 10 is a schematic view of another embodiment of a plug having an associated plug RFID transponder and a socket having an associated socket RFID transponder, wherein functionality of the plug RFID transponder and/or the socket RFID transponder is effected by insertion of the plug into the socket.

FIG. 10 shows a modified version of that shown in FIG. 9, wherein connector RFID integrated circuit chip 738 and connector RFID antenna 740 comprise connector RFID transponder 736 that is associated with the connector 720. The adapter RFID integrated circuit chip 762 and RFID antenna 764 comprise adapter RFID transponder 760 associated with the adapter 732 of housing 734. Connections 766a and 766b, and 768a and 768b, respectively, are provided to electronically connect parts of the two RFID transponders 736 and 760 so as to render them activatable. Otherwise, connector 720 and adapter 732 are similar to that shown in FIG. 9.

Figure 11:
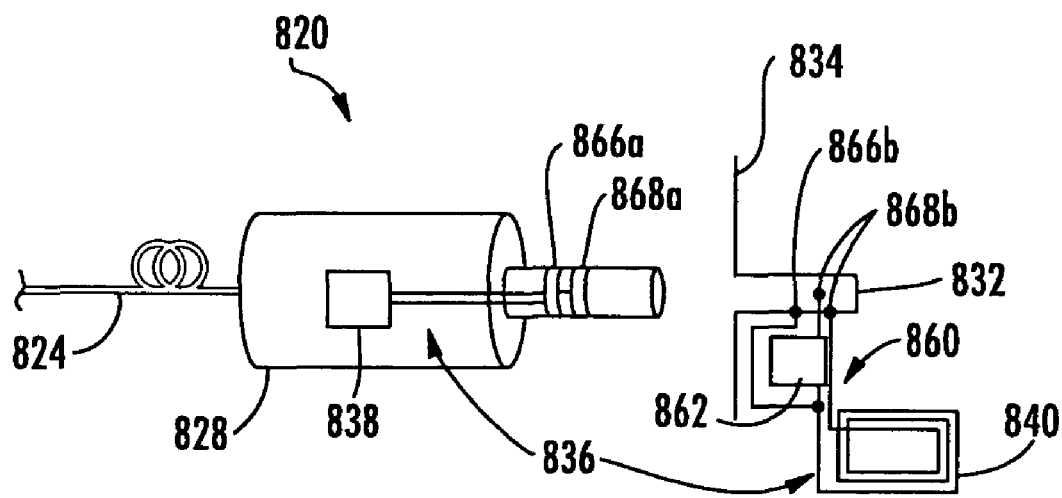
FIG. 11 is a schematic view of yet another embodiment of a plug having an associated plug RFID integrated circuit chip and a socket having an associated socket RFID integrated circuit chip and including one RFID antenna, wherein functionality of the plug RFID transponder and/or the socket RFID transponder is effected by insertion of the plug into the socket.

FIG. 11 shows another modification in which RFID transponders 836 and 860 share a single RFID antenna 840. A connector RFID integrated circuit chip 838 is associated with the connector 820, and an adapter RFID integrated circuit chip 862 is associated with the adapter 832. Connections 866a and 866b, and 868a and 868b, respectively, provide electrical contact to complete the activatable connector RFID transponder 836 and adapter RFID transponder 860.

Figure 12:
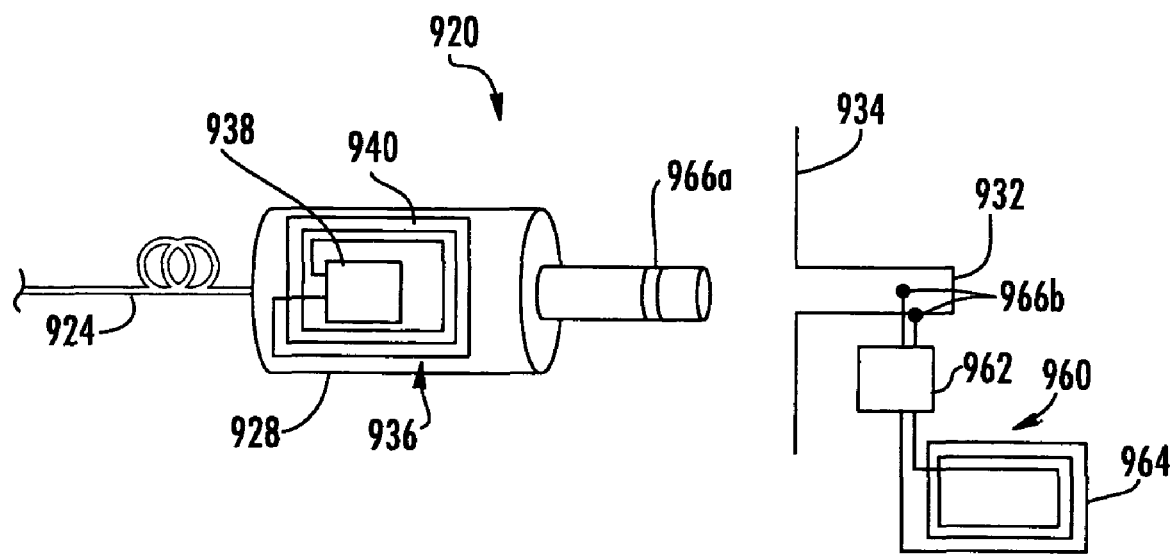
FIG. 12 is a schematic view of another embodiment of a plug having an associated plug RFID transponder and a socket having an associated socket RFID transponder, wherein functionality of the socket RFID transponder is effected by insertion of the plug into the socket, further including a contact closure port function.

FIG. 12 shows yet another embodiment of the present invention in which connector RFID transponder 936 associated with connector 920 and adapter RFID transponder 960 associated with adapter 932 of housing 934 are always complete and active. Therefore, no connections are required to electrically connect RFID integrated circuit chip 938 and RFID antenna 940, or RFID integrated circuit chip 962 and RFID antenna 964. However, the connections 966a and 966b may be used to indicate connection of the plug and the socket, in addition to the functionality described below. It should be kept in mind that any of the condition responsive device embodiments of FIGS. 1-8 could be used with this embodiment, or any other, to detect a condition and/or a change in condition of either of the RFID transponders.

Adapter RFID transponder 960 associated with the adapter 932 of housing 934 includes an electrical contact closure port in communication with RFID integrated circuit chip 962, activated through connections 966a and 966b, which come into contact upon insertion of connector 920 into adapter 932. Therefore, upon insertion of connector 920 into adapter 932, the contact closure condition of RFID transponder 960 will change. Interrogating the RFID transponders and looking for a transponder indicating a change in contact closure condition would identify the RFID transponder associated with the just-connected adapter. If desired, information regarding the adapter and/or connector could then be communicated to the reader regarding one or both of the RFID transponders and the associated component. It should be understood also that the structure and functionality of FIG. 12 could be reversed.

Therefore, the RFID transponder in connector 920 could instead include the contact closure port.

Figure 13:
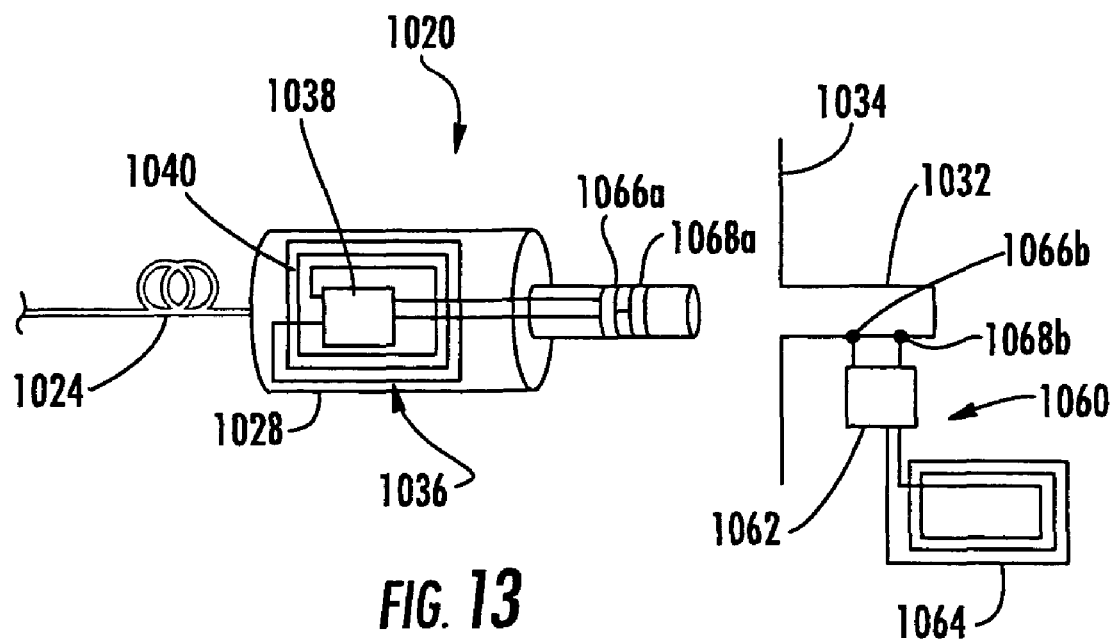
FIG. 13 is a schematic view of still another embodiment of a plug having an associated plug RFID transponder and a socket having an associated socket RFID transponder, wherein functionality of the socket RFID transponder is effected by insertion of the plug into the socket, further including an alternate contact closure port function.

FIG. 13 shows an alternative embodiment of the present invention in which connector RFID transponder 1036 is again entirely located in connector 1020 and adapter RFID transponder 1060 is again entirely located in housing 1034. Both RFID transponders 1036 and 1060 of the embodiment of FIG. 13 are activatable at all times. Electrical connections 1066a and 1066b are provided to allow for a contact closure input adapter for RFID integrated circuit chip 1038. Electrical connections 1068a and 1068b provide a contact closure port output for RFID integrated circuit chip 1062. The contact closure ports created by the contacts can communicate with each other.

This embodiment may or may not rely upon insertion of connector 1020 into adapter 1032. Therefore, this embodiment may operate as above, where insertion of the connector closes both contact closure ports generating a detectable change of condition signal for both the connector and adapter. Alternatively, after insertion of all connectors 1020 into adapters 1032 within housing 1034, the contact closure condition of all housing RFID transponders 1060 could be set to a given value (open or closed). Then, the RFID transponder 1060 for a given adapter could be directed to change its contact closure condition, which would be detected by the associated connector RFID transponder 1036, which would change its condition accordingly. Another polling to determine which connector RFID transponder 1036 had just changed its condition would provide information as to which two RFID transponders 1036 and 1060 in the system were connected. This process could be done the opposite way (starting with the connectors) if desired. Further, this process could be done serially, adapter-by-adapter or connector-by-connector, to map an entire equipment panel in fairly automated fashion. One advantage to the structure of FIG. 13 and the functions made possible thereby are flexibility. Identification can be done by selectively plugging or unplugging, if desired, or by polling without unplugging or any manipulation of buttons by way of directing condition changes via a reader or the like.

Figure 14:
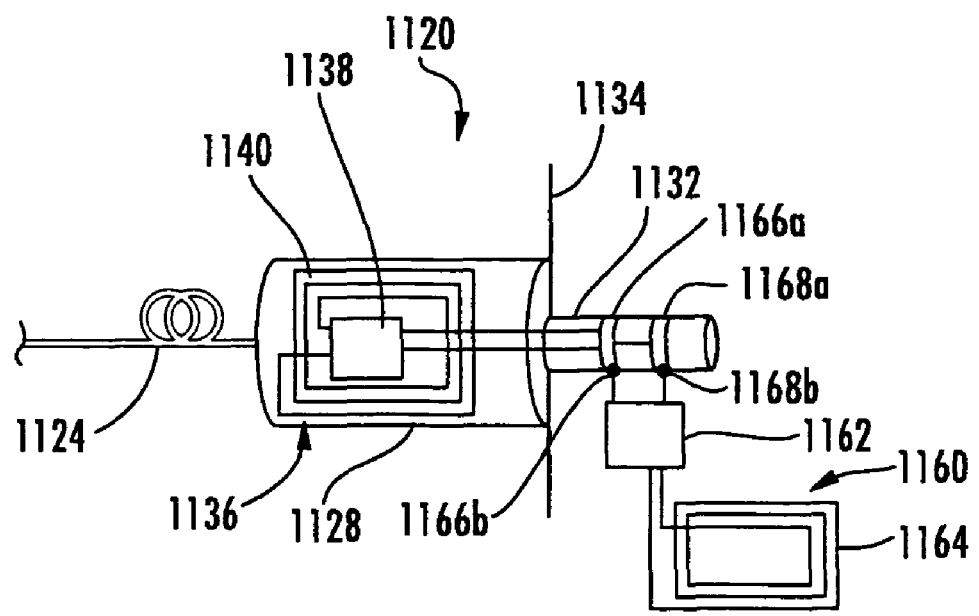
FIG. 14 is a schematic view of another embodiment of a plug having an associated plug RFID transponder and a socket having an associated socket RFID transponder, wherein functionality of the socket RFID transponder is effected by insertion of the plug into the socket, further including an alternate bi-directional contact closure port function.

FIG. 14 shows another connector 1120 and housing 1134 combination of a further embodiment of the present invention, wherein the RFID transponders 1136 and 1160 have bi-directional contact closure ports formed by connections 1166a and 1166b, and 1168a and 1168b. Therefore, the RFID integrated circuit chips 1138 and 1162 could be directed to output their identifications to the other where it would be read and saved, and polling could be conducted to retrieve such information from one or both. In some embodiments of the present invention, an RFID transponder transfers identification information to one or more other RFID transponders using N bit transfer techniques, wherein one integrated circuit forces contact closure (open or closed) N times at a regular interval to provide bits of data (such as identification information) to the other integrated circuit(s) that senses the forced contact closure. Still further embodiments transfer information between or among RFID transponders using other electrical techniques and/or thermal or optical techniques. This approach of RFID transponders identifying one another would allow automatic identification to obtain matching connector and adapter information. RFID integrated circuit chips 1138 and 1162 could require additional power and additional bi-directional communication and sensing functionality. Again, this approach allows cataloging of an entire panel of connections without plugging or unplugging, or the manipulating of buttons or the like.

Figure 15:
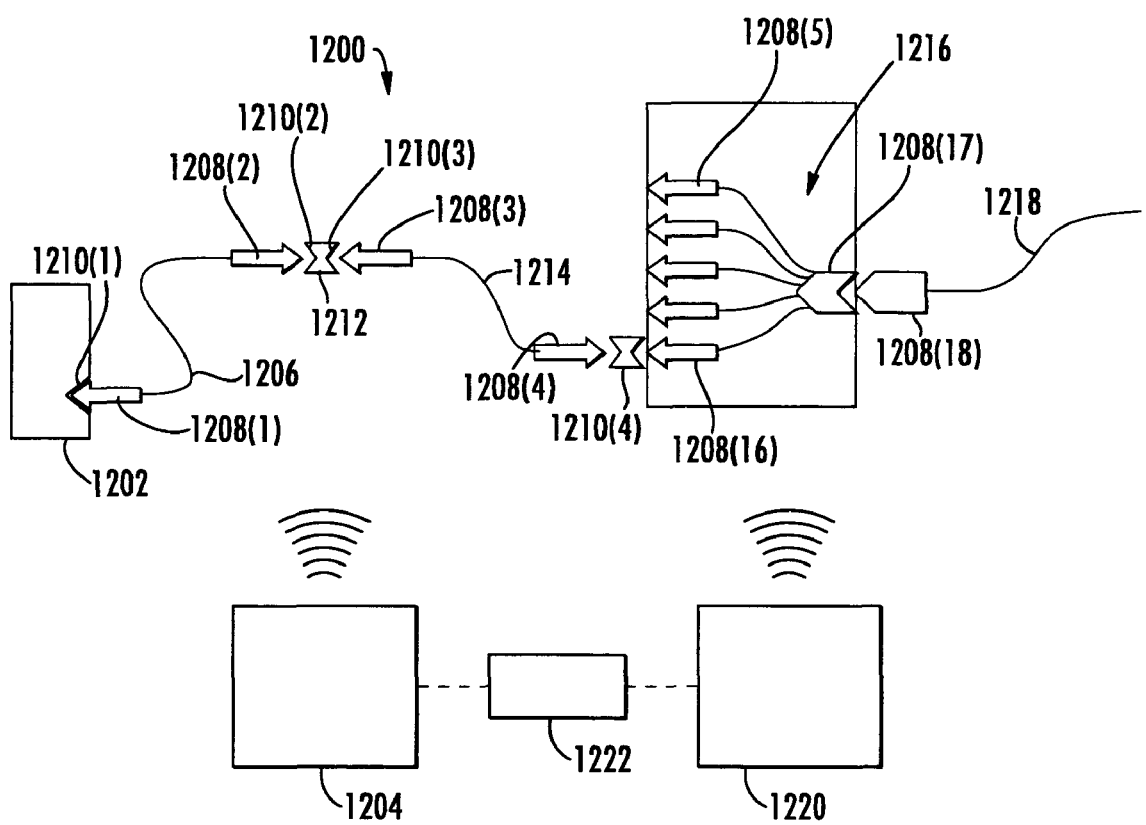
FIG. 15 is a schematic view of one example of a system for mapping fiber optic connections across a network utilizing RFID transponders.

FIG. 15 shows one representative example of a system incorporating certain features of the connectors disclosed above to allow mapping fiber optic cable connections utilizing RFID functions. Various embodiments of the present invention provide for mapping of the physical location of the components associated with the RFID transponders and/or mapping of the connectivity of the components associated with the RFID transponders. Referring again to FIG. 15, as schematically illustrated, system 1200 includes a housing 1202, a reader 1204 and a fiber optic cable 1206. Each end of fiber optic cable 1206 includes a connector 1208(1), 1208(2). Other examples of connectors 1208(3)-1208(18) are further described below. For simplicity of illustration, housing 1202 is shown to include one adapter 1210(1) that receives one connector 1208(1). However, housing 1202 may have a plurality of such adapters for receiving a plurality of connectors. Housing 1202 may comprise any element along a fiber optic cable network, such as a router, server, any connected device, wireless device, patch panel, adapter, or even another connector, etc. Therefore, any device to which a fiber optic cable may be attached could comprise housing 1202.

Each connector 1208 has an associated RFID transponder (not visible in FIG. 15). The RFID transponder may be one of the types discussed above. Thus, the RFID transponders may be entirely or partially located on the connectors. Also, a condition responsive device for detecting a condition and/or change of condition and communicating it to the RFID transponders may also be included. The condition responsive device may include electrical connections, a push button operated device, contact closure structures, or other structures for detecting insertion of a connector plug into an adapter. The adapter may also include an RFID transponder for receiving signals from a condition responsive device and transmitting signals related to the detected condition. Therefore, upon receipt of a connector 1208 into an adapter 1210, a change in condition is registered via one or more of the structures or functions described above. A polling of RFID transponders before and after such insertion, or via sending contact closure instructions and re-polling, will identify which connector and/or adapter have been connected. Information within the inserted connector, in this case 1208(1), will also identify that connector 1208(2) is or should be at the opposite end of fiber optic cable 1206. This information may be made available to the technician, for example for connecting connector 1208(2) to a particular adapter, for connectorizing the cable, etc.

This mapping functionality may be extended. For example, connector 1208(2) may further be received by an adapter 1210(2) in another housing 1212, which may be a patch panel or adapter. Again, a condition responsive device may detect insertion, which can be reported in various ways to reader 1204. Housing 1212 may have another adapter 1210(3) for receiving another connector 1208(3), and the process may continue further, insertion of connector 1208(3) bringing forth identification of connector 1208(4) at the other end of fiber optic cable 1214.

The information can be flexibly managed in various ways, as desired. For example, adapters 1210(2) and 1210(3) may be considered a single adapter connecting two connectors 1208(2) and 1208(3), if desired. Also, internal cabling (not shown) could connect adapters 1210(2) and 1210(3), for example as on the inside of a patch panel housing or the like. The internal cabling could include RFID functionality, for example by connecting to connectors 1208(2) and 1208(3) directly or via adaptors having structure for detecting or communicating change of condition, as described above. Alternatively, a database could hold information regarding which adapters are internally connected within a patch panel by correlating the unique identifications of the respective adapters, and RFID functionality could be employed with the connectors and adapters only.

Cables having different types and numbers of connectors at each end can employ RFID functionality as well. For example, as illustrated, fiber optic cable 1216 comprises a break-out for twelve individual optical fibers. The break-out may also be referred to as a fiber optic fanout assembly. Connectors 1208(5) through 1208(16) (not all shown) each terminate one of the fibers, whereas connector 1208(17) is a multifiber connector. Connector 1208(4) is connected to connector 1208(16), either directly or via an adapter, such as adapter 1210(4). Fiber optic cable 1218 is another twelve-fiber cable having a multifiber connector 1210(18). Each of the connectors and adapters may include RFID transponders, as discussed above, that are associated with condition responsive devices for detecting a condition such as insertion. Also, the RFID transponder on each connector on a cable may be provided at the manufacturing plant and/or in the field with information regarding the other connector or connectors attached to that cable. In addition or alternatively, the RFID transponders may be able to communicate with one another to identify one another and store in memory (preferably in the integrated circuit chip) the identity of the other RFID transponder for subsequent communication with an RFID reader, for example, using the N bit transfer described above with respect to the embodiment of FIG. 14. Therefore, plugging in one end of a cable provides some information via the RFID transponder as to the other end of the cable and/or fiber. It should be understood that any number of fibers could be employed within a cable, and any number of break-outs from the multifiber cable could be employed. Also, a multifiber cable with multifiber connectors at each end could be employed.

It should be kept in mind for purposes of the present disclosure and claims, that a connector connecting directly to other components or another connector (rather than to a patch panel adapter per se, or the like) may be considered an adapter and housing into which the connector is connected. Therefore, the benefits of the present invention, as claimed below, are recognized when two connectors are connected together, with or without an adapter, and one of the connectors or the adapter would therefore be considered the "adapter" for the other connector in that situation. Thus, in some scenarios, the element to which the connector connects would be considered the "adapter" for purposes of this disclosure.

The RFID transponders for multifiber cables may hold additional information, such as fiber order and polarity. If the multifiber connectors include information regarding the ordering of fibers within the multifiber connectors, the functionality can be improved by mapping out with more certainty the communication path throughout the system. Such mapping may include mapping the physical location, the connectivity, and/or other parameters relating to the various components Such a system 1200 can employ a second reader 1220 if desired. Reader 1220 could be a handheld reader used by a technician. In addition or alternatively, reader 1220 could be a second fixed reader (such as reader 1204), so that the range of system 1200 can be extended over a wider area than by using reader 1204 alone. If desired, a database 1222 may be stored in a general or special purpose computer, connected to readers 1204 and 1220 either wirelessly and/or by hard-wiring. Database 1222 can maintain various records as discussed above, including records of connector/adapter connections, RFID interrogations and responses, past and present conditions, and changes of condition, etc.

The use of condition responsive devices to indicate a change of condition such as plug insertion, possibly in combination with cataloged information regarding connector identification by fiber optic cable and/or fiber ordering, can provide various levels of detail and functionality for installing, servicing, or altering a network. It is therefore possible, using the teachings above, to create a network that essentially self-maps itself upon insertion and/or pressing of buttons or other activation of condition responsive devices. Also, such system beneficially does not depend only on proximity of RFID transponders in connectors and adapters, although such functionality could be utilized within a part of such system if desired.

Referring again to the embodiments of the present invention that comprise condition responsive devices, still further embodiments of the present invention comprise condition generating devices that are associated with one or more components (and/or the plug or socket of the respective component) and that are adapted to generate the condition sensed by the condition responsive device. Exemplary embodiments include the systems illustrated in FIGS. 9-14, wherein one of the connector RFID transponder and the adapter RFID transponder includes a condition responsive device and the other RFID transponder comprises a condition generating device. The condition generating device of various embodiments of the present invention generates the condition when a certain event occurs, for example when the plug is inserted into the socket, when the RFID transponder comprising the condition generating device is communicated with by the RFID reader to instruct the generation of the condition, and/or when similar events occur, such that the condition responsive device is able to detect the condition. The condition generated by the condition generating device may be of any form, non-limiting examples include an electric current via an electrical connection, a predetermined RF signal, visual indications, audible indications, or similar conditions. In some embodiments of the present invention the plug must be at least partially received by the socket in order for the condition responsive device to detect the generated condition, whereas in other embodiments the two components with which the condition responsive and condition generating devices are associated need not be in physical contact and/or within a certain distance of one another. The condition generating device of the embodiment of FIG. 14 forces the contact closure that is detected by the condition responsive device (portion of the integrated circuit) of the other RFID transponder to enable the RFID transponder with the condition responsive device to receive information via the N bit transfer from the RFID transponder with the condition generating device. Use of the condition generating device and condition responsive device enable two RFID transponders to communicate with one another in order to correlate the two components, to transfer and/or store identification information about one another, and/or to perform other functions desired by the technician.

As described above with reference to FIG. 15, one component may comprise two or more RFID transponders associated with various portions of the component, such as, for example, a fiber optic drop cable with two or more connectors wherein each connector comprises an associated RFID transponder. In some embodiments of the present invention, each of the RFID transponders associated with the component includes identification information of the other RFID transponders and/or the portions of the component associated with the RFID transponders. In such embodiments, communication with one of the RFID transponders may enable an RFID reader to receive information, such as identification information and the like, about more than one RFID transponder to improve the performance of the RFID system. In additional embodiments of the present invention, the RFID transponders of separate components (or the same component) are adapted to communicate with one another in order to allow information of each of the RFID transponders to be communicated to an RFID reader via communication with only one RFID transponder. In certain of these additional embodiments, the integrated circuit chip of the RFID transponder comprises a memory into which may be stored identification information of other RFID transponders and from which such additional identification information may be retrieved to provide to an RFID reader and/or other RFID transponders. The memory of certain embodiments of the present invention may permanently retain information, may delete information at predetermined intervals, may delete information when commanded, and/or may delete information upon occurrence of a particular event, such as disconnecting the plug from the socket, to list one non-limiting example.

In view of the above, it is apparent that many modifications and re-combinations of the above embodiments or their components may be done within the scope of the invention. Connectors, adapters, cables including connectors, connections comprising a connector and adapter, and mapping systems may include some or multiple of the above features and functionality. One or more condition responsive devices can detect differences in condition. Communication of the detected conditions, either by or between RFID transponders, can provide useful information for identifying or mapping one or more connectors, cables or connections, including mapping all connections on a single panel or across a network. Reliance on alternative systems requiring relative proximity RFID function is not necessary, as detected conditions of one sort or another provide information. Changes in condition brought about by insertion of a connector into an adapter can be designed with connector tolerances that make the resulting information more accurate than proximity-based systems as well, thereby reducing or eliminating false positives. Further, such change-of-condition based systems allow for panels to efficiently include more connections, more tightly spaced. Also, past and present condition information can be stored for later RFID communication for various functions and purposes. If desired some, most or substantially all of the RFID transponder hardware may be located on the connector or housing, depending on the desired application, the need for additional connections, power, etc.

Thus, it will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

That which is claimed:

1. A system for identifying, via an RFID reader, a connection of at least two components, the system comprising:
    a plug associated with the first component;
    a socket associated with the second component, wherein the socket is adapted to receive at least a portion of the plug;
    a pair of contact points associated with at least one of the plug and the socket;
    a plug RFID transponder associated with the plug, wherein the plug RFID transponder comprises a passive RFID transponder;
    a socket RFID transponder associated with the socket, wherein the socket RFID transponder comprises a passive RFID transponder;
    wherein at least one of the plug RFID transponder and the socket RFID transponder is activateable when at least a portion of the plug RFID transponder and the socket RFID transponder, respectively, electrically contacts the pair of contact points when the plug is at least partially received by the socket;
    wherein the RFID reader is able to identify the plug and the socket into which the plug is at least partially received based upon an RFID signal communicated by at least one of the plug RFID transponder and the socket RFID transponder.

2. A system according to claim 1, wherein a first pair of contact points is associated with the plug and a second pair of contact points is associated with the socket, and wherein both the plug RFID transponder and the socket RFID transponder are activateable when at least a portion of the plug RFID transponder electrically contacts the second pair of contact points and at least a portion of the socket RFID transponder electrically contacts the first pair of contact points when the plug is at least partially received by the socket.

3. A system according to claim 1, wherein the second component includes a plurality of sockets and a plurality of socket RFID transponders, wherein the socket RFID transponders are associated with respective sockets.

4. A system according to claim 1, wherein at least one of the plug RFID transponder and the socket RFID transponder comprises an integrated circuit chip that is powered by an external power source.

5. A system according to claim 1, wherein at least one of the plug RFID transponder and the socket RFID transponder is adapted to identify the other of the plug RFID transponder and the socket RFID transponder and to communicate the identity of both the plug RFID transponder and the socket RFID transponder to the RFID reader.

6. A system according to claim 5, wherein at least one of the plug RFID transponder and the socket RFID transponder is adapted to store the identity of the other of the plug RFID transponder and the socket RFID transponder in a memory of at least one of the plug RFID transponder and the socket RFID transponder.

7. A system according to claim 1, wherein the plug comprises a fiber optic connector, and wherein the socket comprises a fiber optic adapter.

8. A system according to claim 1, wherein the plug comprises a copper connector, and wherein the socket comprises a copper adapter.

9. A system for identifying, via an RFID reader, a connection of at least two components of telecommunications equipment, the system comprising:
    a plug associated with a first component of telecommunications equipment;
    a socket associated with a second component of telecommunications equipment, wherein the socket is adapted to receive at least a portion of the plug;
    at least one RFID antenna associated with the socket;
    a plug RFID integrated circuit chip associated with the plug;
    a socket RFID integrated circuit chip associated with the socket;
    wherein at least one of a plug RFID transponder and a socket RFID transponder is defined when at least a portion of the plug is received by the socket such that at least one of the plug RFID integrated circuit chip and the socket RFID integrated circuit chip is in electrical communication with the at least one RFID antenna, wherein the at least one of the plug RFID transponder and the socket RFID transponder defines at least one activateable passive RFID transponder;

wherein the RFID reader is able to identify the connection of the first component of telecommunications equipment to the second component of telecommunications equipment based upon an RFID signal communicated by at least one of the plug RFID transponder and the socket RFID transponder.

10. A system according to claim 9, wherein two RFID antennas are associated with the mating socket, and wherein both a plug RFID transponder and a socket RFID transponder are activateable when at least a portion of the plug is received by the socket.

11. A system according to claim 9, wherein at least one of the plug RFID transponder and the socket RFID transponder is adapted to identify the other of the plug RFID transponder and the socket RFID transponder and to communicate the identity of both the plug RFID transponder and the socket RFID transponder to the RFID reader.

12. A system according to claim 11, wherein at least one of the plug RFID transponder and the socket RFID transponder is adapted to identify the other of the plug RFID transponder and the socket RFID transponder and to store the identity of the other of the plug RFID transponder and the socket RFID transponder in a memory of at least one of the plug RFID transponder and the socket RFID transponder.

13. A system according to claim 9, wherein both a plug RFID transponder and the socket RFID transponder are electrically connected to a single RFID antenna associated with the socket, and wherein both the plug RFID transponder and the socket RFID transponder are activateable when at least a portion of the plug is received by the socket.

14. A system according to claim 9, wherein at least one of the plug RFID integrated circuit chip and the socket RFID integrated circuit chip comprises a switch to selectively create an electrical connection between the RFID integrated circuit chip and an RFID antenna based upon an instruction received from the RFID reader.

15. A system according to claim 9, wherein the plug comprises a fiber optic connector, and wherein the socket comprises a fiber optic adapter.

16. A system according to claim 9, wherein the plug comprises a copper connector, and wherein the socket comprises a copper adapter.

17. A system for identifying, via an RFID reader, a connection of at least two components of telecommunications equipment, the system comprising:
a plug associated with a first component of telecommunications equipment;
a socket associated with a second component of telecommunications equipment, wherein the socket is adapted to receive at least a portion of the plug;
a plug RFID transponder associated with the plug, wherein the plug RFID transponder comprises a passive RFID transponder;
a socket RFID transponder associated with the socket, wherein the socket RFID transponder comprises a passive RFID transponder;
a condition responsive device associated with at least one of the plug and socket and in electrical communication with the respective plug RFID transponder or socket RFID transponder, wherein the condition responsive device is adapted to detect a condition; and
a condition generating device associated with at least one of the plug and socket, wherein the condition generating device is adapted to generate the condition detected by the condition responsive device;
wherein at least one of the plug RFID transponder and the socket RFID transponder is activateable when the condition responsive device detects the condition generated by the condition generating device;
wherein the RFID reader is able to identify the connection of the first component of telecommunications equipment to the second component of telecommunications equipment by receiving an RFID signal from at least one of the plug RFID transponder and the socket RFID transponder.

18. A system according to claim 17, wherein the condition responsive device is adapted to detect the receipt of at least a portion of the plug in the socket.

19. A system according to claim 17, wherein the plug must be received by the socket for the condition generated by the condition generating device to be applied to the condition responsive device.

20. A system according to claim 17, wherein the condition generating device is adapted to generate the condition when instructed by the RFID reader.

21. A system according to claim 17, wherein the condition responsive device is associated with the plug and the condition generating device is associated with the socket.

22. A system according to claim 17, wherein the condition generated by the condition generating device relates to the receipt of at least a portion of the plug in the socket.

23. A system according to claim 17, wherein the condition generated by the condition generating device relates to at least one of a voltage and a current of an electric signal detected by the condition responsive device.

24. A system according to claim 17, wherein at least one of the plug RFID transponder and the socket RFID transponder is adapted to identify the other of the plug RFID transponder and the socket RFID transponder and to communicate the identity of both the plug RFID transponder and the socket RFID transponder to the RFID reader.

25. A system according to claim 24, wherein at least one of the plug RFID transponder and the socket RFID transponder is adapted to identify the other of the plug RFID transponder and the socket RFID transponder and to store the identity of the other of the plug RFID transponder and the socket RFID transponder in a memory of at least one of the plug RFID transponder and the socket RFID transponder.

26. A system according to claim 25, wherein the stored identity of the other of the plug RFID transponder and the socket RFID transponder in the memory of at least one of the plug RFID transponder and the socket RFID transponder is erased when the plug is removed from the socket.

27. A system according to claim 17, wherein the plug comprises a fiber optic connector, and wherein the socket comprises a fiber optic adapter.

28. A system according to claim 17, wherein the plug comprises a copper connector, and wherein the socket comprises a copper adapter.

29. A system for identifying, via an RFID reader, a connection of at least two components, the system comprising:
a plug associated with the first component;
a socket associated with the second component, wherein the socket is adapted to receive at least a portion of the plug;
a plug RFID transponder associated with the plug, wherein the plug RFID transponder comprises a passive RFID transponder;

a socket RFID transponder associated with the socket, wherein the socket RFID transponder comprises a passive RFID transponder;

wherein at least one of the plug RFID transponder and the socket RFID transponder is adapted to identify the other of the plug RFID transponder and the socket RFID transponder and to selectively communicate an RFID signal with the identity of both the plug RFID transponder and the socket RFID transponder to the RFID reader when at least a portion of the plug is received by the socket;

wherein the RFID reader is able to identify the connection of the first component to the second component based upon the RFID signal communicated by at least one of the plug RFID transponder and the socket RFID transponder.

30. A system according to claim 29, wherein the second component includes a plurality of sockets and a plurality of socket RFID transponders, wherein the socket RFID transponders are associated with respective sockets.

31. A system according to claim 29, wherein at least one of the plug RFID transponder and the socket RFID transponder is activateable regardless of whether engagement is made between the respective electrical contacts.

32. A system according to claim 29, wherein at least one of the plug RFID transponder and the socket RFID transponder comprises an integrated circuit chip that is powered by an external power source.

33. A system according to claim 29, wherein at least one of the plug RFID transponder and the socket RFID transponder is adapted to store the identity of the other of the plug RFID transponder and the socket RFID transponder in a memory of at least one of the plug RFID transponder and the socket RFID transponder.

34. A system according to claim 29, wherein the plug comprises a fiber optic connector, and wherein the socket comprises a fiber optic adapter.

35. A system according to claim 29, wherein the plug comprises at least one of a fiber optic laser card, a fiber optic receiver, a fiber optic attenuator, a fiber optic multiplexer, and other fiber optic components, and wherein the socket comprises a fiber optic component corresponding to the plug.

36. A system according to claim 29, wherein the plug comprises a copper connector, and wherein the socket comprises a copper adapter.

37. A system for identifying, via an RFID reader, a connection of at least two components of telecommunications equipment, the system comprising:

a plug associated with a first component of telecommunications equipment;

a socket associated with a second component of telecommunications equipment, wherein the socket is adapted to receive at least a portion of the plug;

a plug RFID transponder associated with the plug, wherein the plug RFID transponder comprises a passive RFID transponder; and a socket RFID transponder associated with the socket, wherein the socket RFID transponder comprises a passive RFID transponder;

wherein at least one of the plug RFID transponder and the socket RFID transponder comprises an electrical contact capable of forcing contact closure and the other of the plug RFID transponder and the socket RFID transponder comprises an electrical contact capable of sensing the contact closure of the electrical contact of the other of the plug RFID transponder and the socket RFID transponder when at least a portion of the plug is received by the socket;

wherein at least one of the plug RFID transponder and the socket RFID transponder is adapted to identify the other of the plug RFID transponder and the socket RFID transponder and to selectively communicate an RFID signal with the identity of both the plug RFID transponder and the socket RFID transponder to the RFID reader when the electrical contact capable of sensing the contact closure senses the contact closure;

wherein the RFID reader is able to identify the connection of the first component of telecommunications equipment to the second component of telecommunications equipment based upon the RFID signal communicated by at least one of the plug RFID transponder and the socket RFID transponder.

38. A system according to claim 37, wherein the electrical contact capable of forcing contact closure is associated with the socket RFID transponder and the electrical contact capable of sensing contact closure is associated with the plug RFID transponder.

39. A system according to claim 37, wherein at least one of the plug RFID transponder and the socket RFID transponder is adapted to store the identity of the other of the plug RFID transponder and the socket RFID transponder in a memory of at least one of the plug RFID transponder and the socket RFID transponder.

40. A system according to claim 39, wherein the stored identity of the other of the plug RFID transponder and the socket RFID transponder in the memory of at least one of the plug RFID transponder and the socket RFID transponder is erased when the plug is removed from the socket.

41. A system according to claim 37, wherein the plug comprises a fiber optic connector, and wherein the socket comprises a fiber optic adapter.

42. A system according to claim 37, wherein the plug comprises at least one of a fiber optic laser card, a fiber optic receiver, a fiber optic attenuator, a fiber optic multiplexer, and other fiber optic components, and wherein the socket comprises a fiber optic component corresponding to the plug.

43. A system according to claim 37, wherein the plug comprises a copper connector, and wherein the socket comprises a copper adapter.

* * * * *